(12) United States Patent
Schwab

(10) Patent No.: US 10,399,308 B2
(45) Date of Patent: Sep. 3, 2019

(54) THREE DIMENSIONAL SINGLE-LAYER FABRIC AND ASSEMBLY METHODS THEREFOR

(71) Applicant: Matthew J. Schwab, Eau Claire, WI (US)

(72) Inventor: Matthew J. Schwab, Eau Claire, WI (US)

( * ) Notice: Subject to any disclaimer, the term of this patent is extended or adjusted under 35 U.S.C. 154(b) by 0 days.

(21) Appl. No.: 16/210,654

(22) Filed: Dec. 5, 2018

(65) Prior Publication Data

US 2019/0105882 A1 Apr. 11, 2019

Related U.S. Application Data

(60) Division of application No. 15/254,112, filed on Sep. 1, 2016, now abandoned, which is a continuation-in-part of application No. 15/211,211, filed on Jul. 15, 2016, which is a continuation-in-part of application No. 14/956,979, filed on Dec. 2, 2015, now abandoned, which is a continuation-in-part of application No. 14/132,723, filed on Dec. 18, 2013, now abandoned.

(Continued)

(51) Int. Cl.
*B29C 65/70* (2006.01)
*B32B 27/12* (2006.01)
(Continued)

(52) U.S. Cl.
CPC .......... *B32B 27/12* (2013.01); *B29C 44/1219* (2013.01); *B29C 44/3403* (2013.01); *B29C 65/50* (2013.01); *B32B 3/10* (2013.01); *B32B 5/024* (2013.01); *B32B 5/026* (2013.01); *B32B 5/06* (2013.01); *B32B 5/08* (2013.01); *B32B 5/18* (2013.01); *B32B 5/26* (2013.01); *B32B 7/05* (2019.01); *B32B 7/12* (2013.01); *B32B 27/065* (2013.01); *B32B 27/36* (2013.01); *B32B 27/40* (2013.01); *A41D 31/02* (2013.01); *B29C 51/10* (2013.01); *B29C 51/145* (2013.01); *B29C 65/02* (2013.01); *B29C 65/04* (2013.01); *B29C 65/06* (2013.01); *B29C 65/08* (2013.01); *B29C 65/16* (2013.01); *B29C 65/48* (2013.01); *B29C 66/1122* (2013.01); *B29C 66/431* (2013.01); *B29C 66/861* (2013.01); *B29C 66/863* (2013.01); *B29K 2075/00* (2013.01); *B29K 2105/04* (2013.01); *B29K 2105/253* (2013.01); *B29L 2031/48* (2013.01);
(Continued)

(58) Field of Classification Search
CPC ............ B29C 66/431; F41H 3/00; F41H 3/02
USPC ....................................................... 156/217
See application file for complete search history.

(56) References Cited

U.S. PATENT DOCUMENTS

| | | |
|---|---|---|
| 3,285,768 A | 11/1966 | Habib |
| 5,364,686 A | 11/1994 | Disselbeck et al. |

(Continued)

FOREIGN PATENT DOCUMENTS

| | | |
|---|---|---|
| CA | 2384031 | 3/2001 |
| KR | 1020060077886 | 7/2006 |

*Primary Examiner* — Scott W Dodds
(74) *Attorney, Agent, or Firm* — Briggs and Morgan, P.A.; Gerald E. Helget

(57) ABSTRACT

A single-layer 3D fabric of traditional camouflage synthetic fabric with outwardly extending random hollow tunnels therein with weldments in the fabric layer intermittently along the tunnels to hold the outwardly extending hollow tunnels in place. The tunnels have variable depth, typically ranging from between about 0.25 inches to about 2.0 inches. The 3D fabric is produced from a molding process that creates the outer dimensional layer. The 3D fabrics have unique visual properties which make them desirable for a variety of applications.

7 Claims, 21 Drawing Sheets

Related U.S. Application Data

(60) Provisional application No. 61/797,962, filed on Dec. 19, 2012, provisional application No. 61/852,146, filed on Mar. 15, 2013.

(51) Int. Cl.
| | |
|---|---|
| *B29C 44/12* | (2006.01) |
| *B29C 44/34* | (2006.01) |
| *B29C 65/50* | (2006.01) |
| *B32B 27/40* | (2006.01) |
| *B32B 5/02* | (2006.01) |
| *B32B 27/36* | (2006.01) |
| *B32B 27/06* | (2006.01) |
| *B32B 5/18* | (2006.01) |
| *B32B 5/26* | (2006.01) |
| *B32B 5/06* | (2006.01) |
| *B32B 5/08* | (2006.01) |
| *B32B 7/12* | (2006.01) |
| *B32B 3/10* | (2006.01) |
| *B32B 7/05* | (2019.01) |
| *B29C 65/08* | (2006.01) |
| *B29C 65/04* | (2006.01) |
| *B29C 65/16* | (2006.01) |
| *B29K 75/00* | (2006.01) |
| *B29K 105/04* | (2006.01) |
| *B29K 105/00* | (2006.01) |
| *B29L 31/48* | (2006.01) |
| *B29L 31/00* | (2006.01) |
| *A41D 31/02* | (2019.01) |
| *B29C 51/10* | (2006.01) |
| *B29C 65/48* | (2006.01) |
| *B29C 65/00* | (2006.01) |
| *B29C 65/02* | (2006.01) |
| *B29C 65/06* | (2006.01) |
| *B29C 51/14* | (2006.01) |

(52) U.S. Cl.
CPC . *B29L 2031/726* (2013.01); *B32B 2262/0276* (2013.01); *B32B 2262/062* (2013.01); *B32B 2262/14* (2013.01); *B32B 2266/0278* (2013.01); *B32B 2266/06* (2013.01); *B32B 2307/4026* (2013.01); *B32B 2307/546* (2013.01); *B32B 2307/72* (2013.01); *B32B 2307/724* (2013.01); *B32B 2307/732* (2013.01); *B32B 2437/00* (2013.01); *B32B 2607/02* (2013.01); *Y10T 428/24512* (2015.01)

(56) References Cited

U.S. PATENT DOCUMENTS

| | | |
|---|---|---|
| 5,445,863 A | 8/1995 | Slagle et al. |
| 5,773,101 A | 6/1998 | Sanders |
| 6,066,391 A | 5/2000 | Ogawa et al. |
| 6,423,165 B1 | 7/2002 | Hishinuma |
| 6,460,185 B1 | 10/2002 | Hardy |
| 6,623,839 B2 | 9/2003 | Hu |
| 6,668,381 B2 | 12/2003 | Tarrell |
| 6,723,416 B1 | 4/2004 | Groitzsch et al. |
| 7,172,801 B2 | 2/2007 | Hoying et al. |
| 7,229,680 B1 | 6/2007 | Crompton |
| 7,476,438 B2 | 1/2009 | Gorres |
| 7,832,067 B2 | 11/2010 | Tarrell |
| 2003/0096548 A1 | 5/2003 | Groitzsch et al. |
| 2004/0109992 A1 | 6/2004 | Gribble et al. |
| 2012/0118133 A1 | 5/2012 | Saucedo |
| 2014/0004332 A1 | 1/2014 | Kanayama |

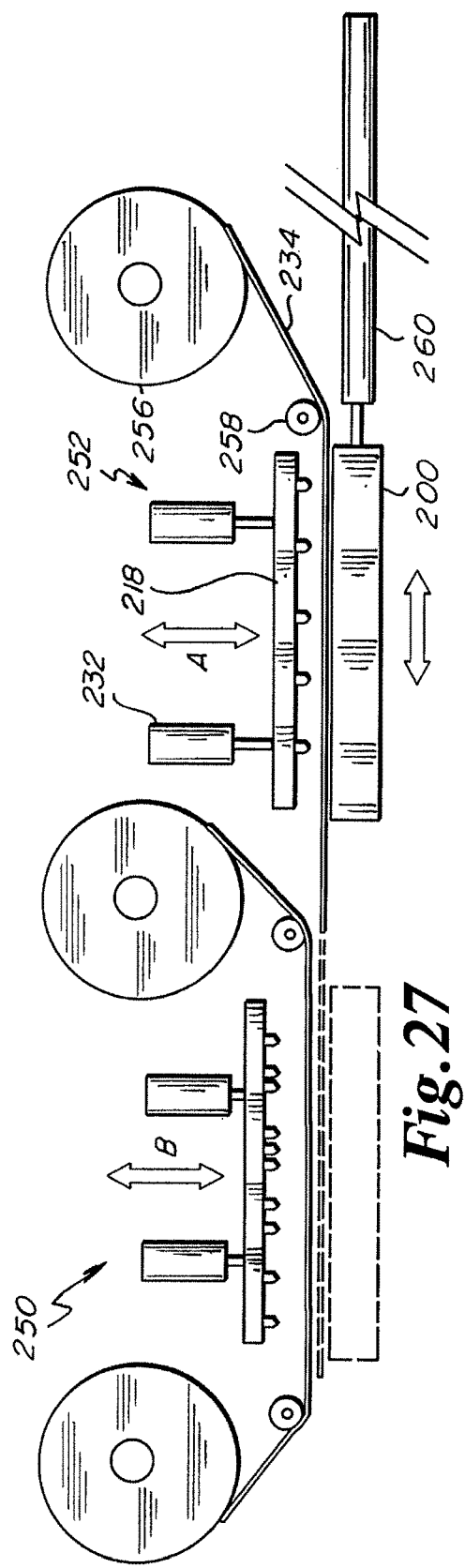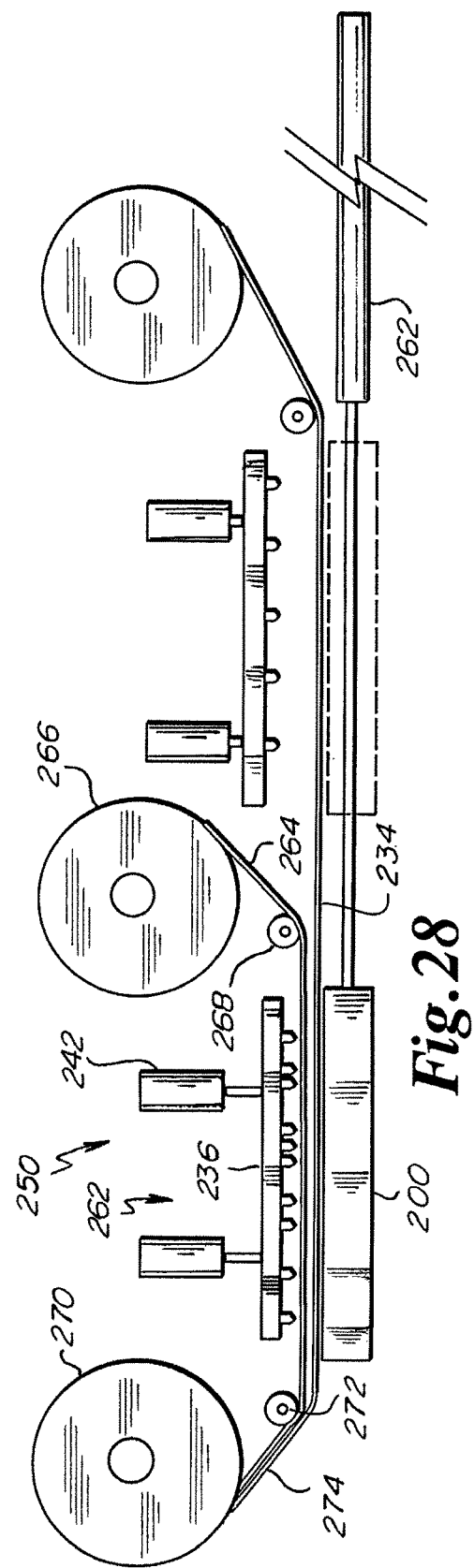
Fig.27
Fig.28

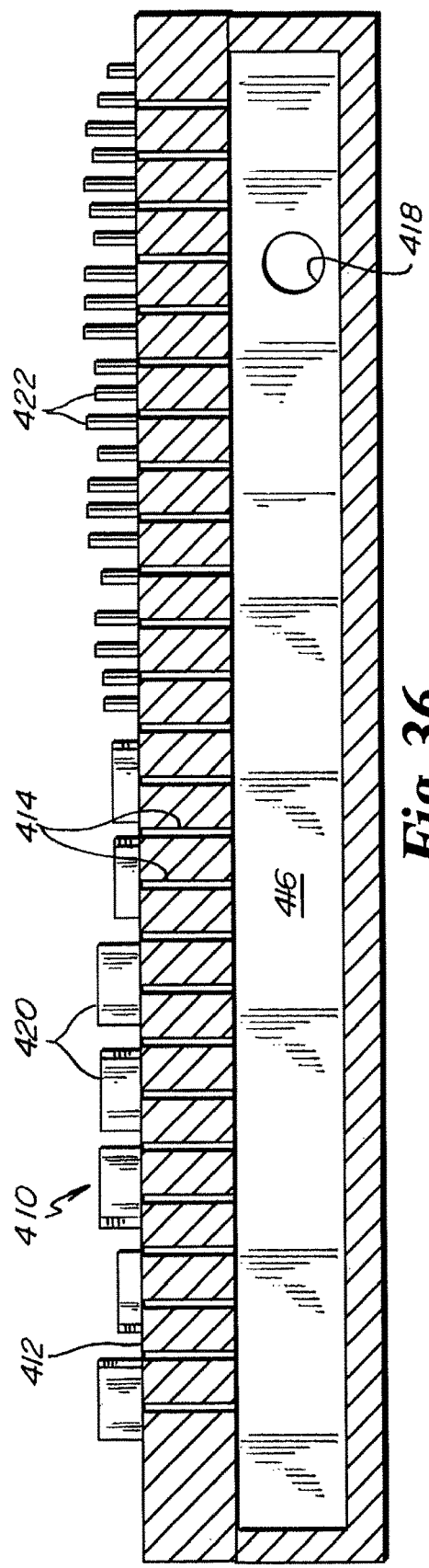
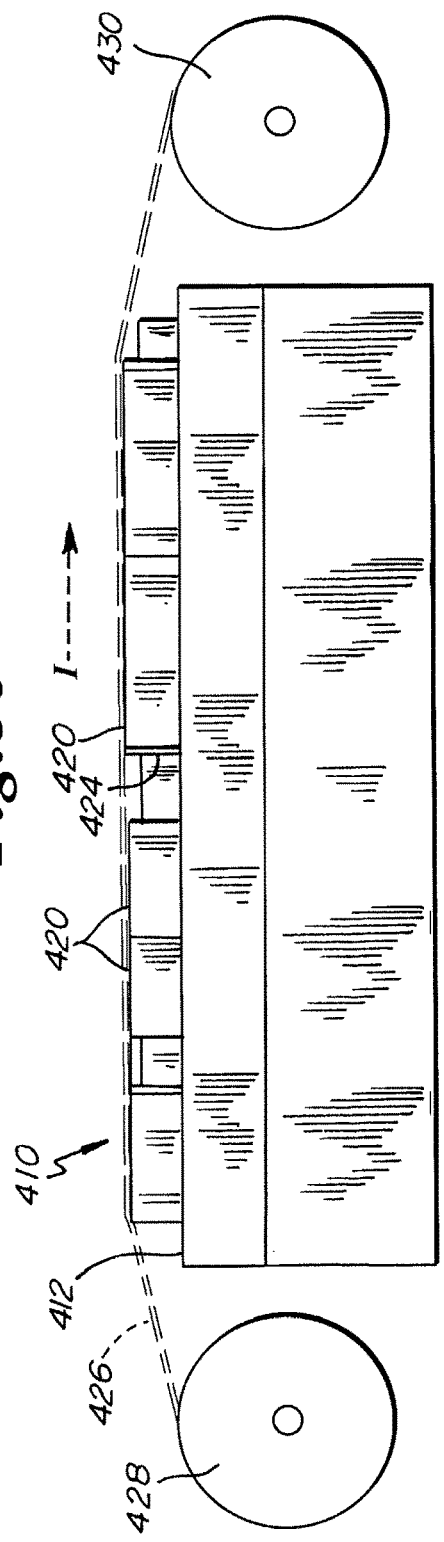
Fig. 36
Fig. 37

THREE DIMENSIONAL SINGLE-LAYER FABRIC AND ASSEMBLY METHODS THEREFOR

PRIORITY CLAIM

This application is a Divisional of U.S. application Ser. No. 15/254,112, filed Sep. 1, 2016, which is a Continuation-In-Part application which claims priority to Utility patent application Ser. No. 15/211,211, filed Jul. 15, 2016, which claims priority to Utility patent application Ser. No. 14/956,979, filed Dec. 2, 2015 which claims priority to Utility patent application Ser. No. 14/132,723, filed Dec. 18, 2013 which claims priority to U.S. Provisional Patent Application No. 61/797,962, filed Dec. 19, 2012, and U.S. Provisional Patent Application No. 61/852,146, filed Mar. 15, 2013, the contents of which are both incorporated by reference herein.

FIELD OF THE INVENTION

The present invention relates to three-dimensional ("3D") fabrics.

BACKGROUND OF THE INVENTION

Camouflage suits for bow-hunting deer typically are made with fabrics having printed patterns intended to blend in with colors and patterns in the hunter's background. More elaborate camouflage suits, such as the ghillie suit, are also available. There is a need for improved camouflage suits that blend into the background. The materials and methods developed for camouflage suits have broad applicability in other areas as well.

BRIEF DESCRIPTION OF THE INVENTION 3D fabrics maybe a single layer or have multiple layers including an outer dimensional layer of traditional fabric and a liner layer integrated with outer layer suitable with air or foam therebetween. The 3D fabrics have variable depth, typically ranging from between about 0.25 inches to about 4.0 inches. The 3D fabrics are produced from a master mold and process that creates the outer dimensional layer while not adhering the outer layer to a liner layer. The 3D fabrics have unique visual properties which make them desirable for a variety of applications.

A principal object and advantage of the 3D fabrics of the invention are that they are easily sewable using conventional equipment, as the dimensional outer layer is compressible during the sewing process. However, in some applications where thick dimensional layers are desired in portions of the fabric, it may be desirable to design and manufacture the fabric to have thinner areas of the dimensional layer in accordance with specific patterns. In some cases, the 3D fabric may include areas without the dimensional layer for application-specific needs.

Another principal object and advantage of the 3D fabrics of the invention is that they have a wide variety of applications. They may be used for camouflage hunting apparel. They may be used for military camouflage apparel. They may be used for producing ordinary apparel (such as coats, pants, hats, shoes, etc. . . . ) with interesting visual effects. They may be used for producing ordinary apparel for their insulating properties. They may be used for furniture coverings. They may be used in wall coverings. They may be used in set designs. Specialty outer and inner fabric layers may be incorporated for properties such as sonic insulation, thermal insulation, heat retention, heat reflectivity, indetectability to remote sensors (radar, sonar, infra-red detectors, and the like). Electronics may be molded into the dimensional layer for purposes of communication, monitoring of body functions, lighting and the like). Other applications of the fabrics will also become apparent over time.

Another principal object and advantage of the 3D fabrics of the invention he present invention is that the fabrics include materials and methods to produce unique wearable three-dimensional (3-D) fabrics 5. The fabrics 5 comprise an optional inner fabric layer 12, a dimensional layer 10 made of breathable foam, and a patterned outer layer 8. The dimensional layer 10 may be molded to have contours matching the pattern of the outer layer 8, with the resulting multilayer fabric 5 or 26 having both physical and graphical depth.

Another principal object and advantage of the 3D fabrics of the invention is that one application of this technology is to create camouflaged clothing articles. For example, a suit comprising a jacket and pants may have a tree or woods motif, where the dimensional layer is specifically contoured to match graphically patterned branches and leaves on the outer fabric layer. Preferably, the depth of the 3D fabric varies from about 0.25 inches to about 4.0 inches, and more preferably from about 0.25 inches to about 2.0 inches. Outer fabric layer patterns may include trees, leaves, branches, grassland vegetation, and the like. The patterns may be selected from different types of outdoor environments: oak woods, pine forests, maple forests, and the like.

Another principal object and advantage of the 3D fabrics of the invention is that the 3D fabrics used to make the articles of clothing are constructed out of pattern panels (e.g., sleeves, collar, back, etc. . . . ) that are formed in molded sections. Each section includes all the pattern panels for the given article of clothing. The pattern panels will be arranged on the molded sections to minimize waste. Clothing articles made of 3D fabrics include normal clothing features such as pockets and zippers.

Another principal object and advantage of the 3D fabrics of the invention is that the printed or graphical patterns on the outer fabric layer are selected or designed to match the physical depth of the 3D fabric, i.e., a printed branch on the pattern will correspond with the shape of the branch on the 3D fabric. This is useful for camouflage and other applications. However, it is within the scope of the invention to have 3D physical patterns that do not match the graphical patterns.

Another principal object and advantage of the 3D fabrics of the invention is that the fabric liner may be a sheet of material, a strip or fabric welding tape which makes the 3D fabrics relatively inexpensive and easy to manufacture at one master mold station.

Another principal object and advantage of the single-layer 3D fabric of the invention is that the fabric need not a liner which makes the 3D fabric relatively inexpensive and easy to manufacture at one master mold station.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 27 depicts a side elevational view of the first station in the assembly method of making the 3D fabric.

FIG. 28 depicts a side elevational view of the second station in the assembly method of making the 3D fabric.

FIG. 36 a cross sectional view taken along lines 36-36 of FIG. 35.

FIG. 37 is an end view of the single-layer 3D fabric master mold forming plate for the making of the 3D fabric of the sixth embodiment.

DETAILED DESCRIPTION

Figure 1:
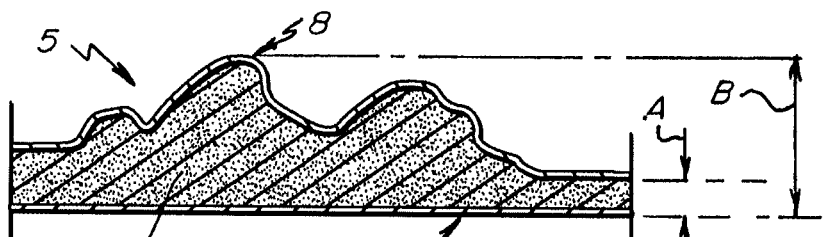
FIG. 1 depicts a cross-sectional view of a first embodiment of a 3D fabric.

Embodiments of the present invention are described herein in the context of compositions of three dimensional (3D) fabrics and methods for making 3D fabrics and articles using 3D fabrics. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Definitions:

"Traditional fabrics" are essentially flat, single layer materials such as cotton cloth, wool cloth, synthetic or synthetic blend cloth, and felt. While these fabrics have a dimension of thickness or depth, the thickness is typically small (less than about 3 mm) and uniform.

"Three dimensional fabric" or "3D fabric" refers to a multilayer fabric having an outer dimensional fabric layer and a liner layer that gives the fabric variable physical depth, where the outer layer is integrally bonded to the liner layer be it a sheet, strips or tape. In some cases, the liner layer maybe the dimensional layer.

FIGS. 1 through 6 depicts a cross-sectional view of a first embodiment 5 of a 3D fabric and method of making. In the figure, 3D fabric 5 comprises outer fabric layer 8 and dimensional layer 10. Outer fabric layer 8 is a traditional fabric and has a consistent thickness that makes up only a small fraction of the overall thickness of the 3D fabric 5. Dimensional layer 10 provides variable physical depth to the fabric. In this first embodiment, the dimensional layer has a variable thickness, with one essentially flat side and a contoured side. The minimum thickness/depth of this first embodiment of 3D fabric 5 is shown by dimension A and the maximum thickness/depth of 3D fabric 5 is shown by dimension B. Because of the flat side, the thickness of the dimensional layer is about the same as the depth of the 3D fabric. 3D fabric may also optionally include inner fabric layer 12.

Figure 6:
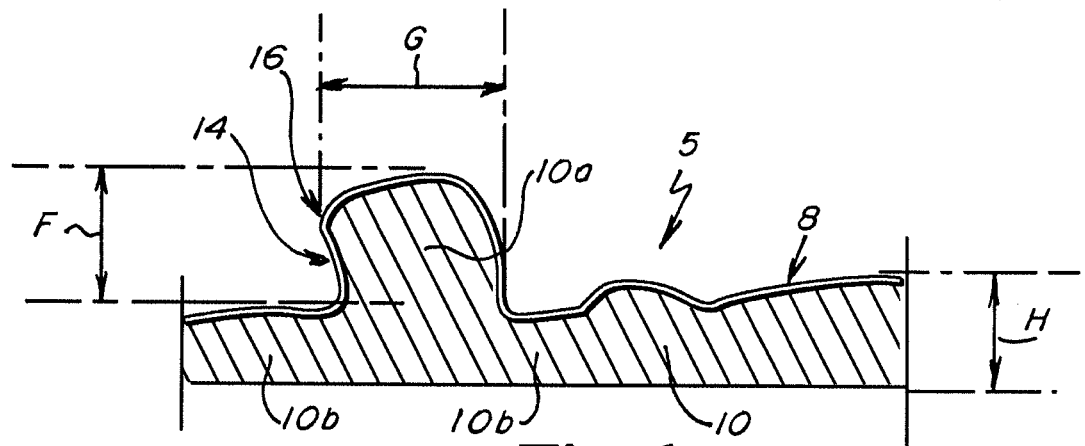
FIG. 6 depicts another cross-sectional view of a first embodiment of a 3D fabric.

FIG. 6 also depicts a cross-sectional view of a slight variation of the first embodiment 5, showing an additional feature. Raised feature 14 is a part of the 3D fabric 5 where dimensional layer 10a is significantly thicker (F plus H) than the adjoining dimensional layer 10b (thickness H). Raised features may be defined as having an extra thickness F that is about equal to or greater to the width G of the feature and/or having a double-back area 16 where outer fabric layer 8 doubles back across itself when viewed in cross-section. Raised features may be used for a variety of purposes. They may be used to give the appearances of sticks or branches in camouflage 3D fabrics 5. They may be used to simulate objects in other applications (e.g., a cartoon character head on a jacket or necktie). They may also simply be used to simply provide visual interest. Because of physical limitations, they require that the thickness of the dimensional layer 10 is not uniform, though raised features may be incorporated into the embodiment of 3D fabrics shown in FIG. 7 with uniform thickness.

Figure 2:
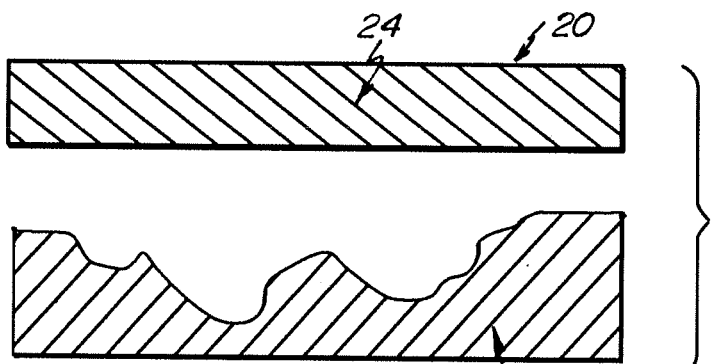
FIG. 2 depicts a cross-sectional view of an embodiment of a mold for making the first embodiment of the 3D fabric.

FIG. 2 depicts a cross-sectional view of an embodiment of a compression mold 20 for making the first embodiment of the 3D fabric 5. In this embodiment, the mold comprises a dimensional portion 22 and a flat portion 24.

Figure 7:
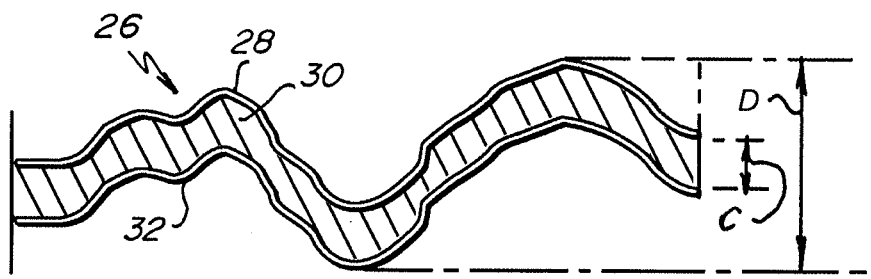
FIG. 7 depicts a cross-sectional view of a second embodiment of a 3D fabric.

FIG. 7 depicts a cross-sectional view of a second embodiment of a 3D fabric 26. In the figure, 3D fabric 26 comprises outer fabric layer 28 and dimensional layer 30. As in the first embodiment, outer fabric layer 28 has a consistent thickness that makes up only a small fraction of the overall thickness of the 3D fabric 26. In this second embodiment 26, the dimensional layer 30 has a more uniform thickness C, with contours on both sides. In this second embodiment 26, the thickness C of the dimensional layer 30 is not the same as the depth D of the 3D fabric 26. The thickness of the fabric 26 is essentially uniform, while the depth D is variable, thereby providing the physical 3D effect. 3D fabric 26 may also optionally include inner fabric layer 32. In this embodiment, the dimensional layer 30 is preferably between about 0.5 to 10.0 cm thick, and more preferably between about 1.0 and 3.0 cm thick.

Figure 8:
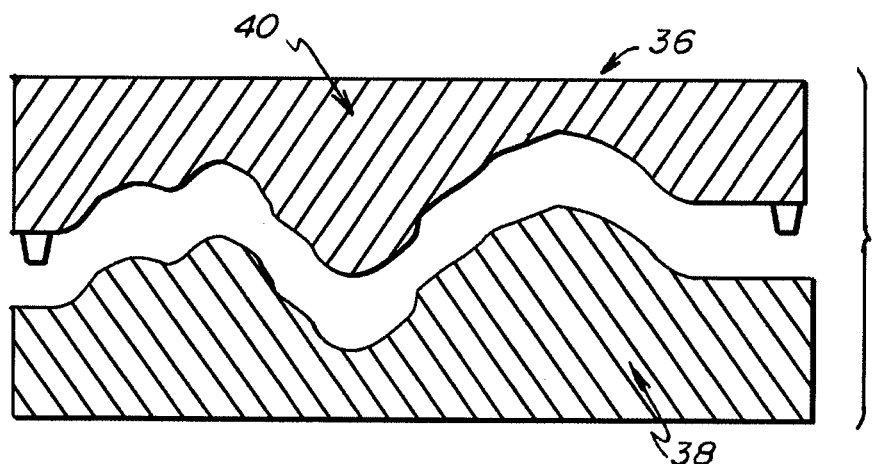
FIG. 8 depicts a cross-sectional view of an embodiment of a mold for making the second embodiment of the 3D fabric.

FIG. 8 depicts a cross-sectional view of an embodiment of a compression mold 36 for making the second embodiment of 26 the 3D fabric. Both parts of the mold are contoured, and may be referred to as lower portion 38 and upper portion 40. During the molding process, the molds are 38 and 40 positioned to be separated by the thickness of the dimensional layer 30.

It is within the invention to produce molds and fabrics intermediate and in combination between those embodiments depicted in FIGS. 1, 2 and 6 and those depicted in FIGS. 7 and 8 by having the upper mold portion 24 not be completely flat, yet not designed to have a uniform molding distance from the lower mold. The resulting fabrics will have two contoured sides without having a uniform thickness. In such cases, the portions of the fabric having the most depth will generally also have the greatest thickness.

In both embodiments, the outer fabric layer 8 or 28 is preferably colored or patterned on the outer surface side. The optional inner fabric layer 12 or 32 is typically not visible when the 3D fabric 5 or 26 is incorporated into an article of clothing.

The dimensional layer 10 or 30 comprises a flexible, open-cell polyurethane foam with a preferred density between about 2.0 and 4.0 pounds/cubic foot, and more preferably a density between about 2.8 and 3.4 pounds/cubic foot. The foam is formed by a polymerization reaction between an isocyanate component and a polyol component that are mixed immediately prior to molding. Mixing the components produces a viscous dense liquid, which will be referred to herein as the "foam mixture." As the polymerization reaction progresses, gases are produced which form the cells in the foam and results in an increase in volume of the mixture. The "rise time" is the period of volume expansion. In the context of the present invention, the two parts of the mold must be positioned during the rise time, thereby confining the dimensional layer before the end of the rise time.

Figure 3:
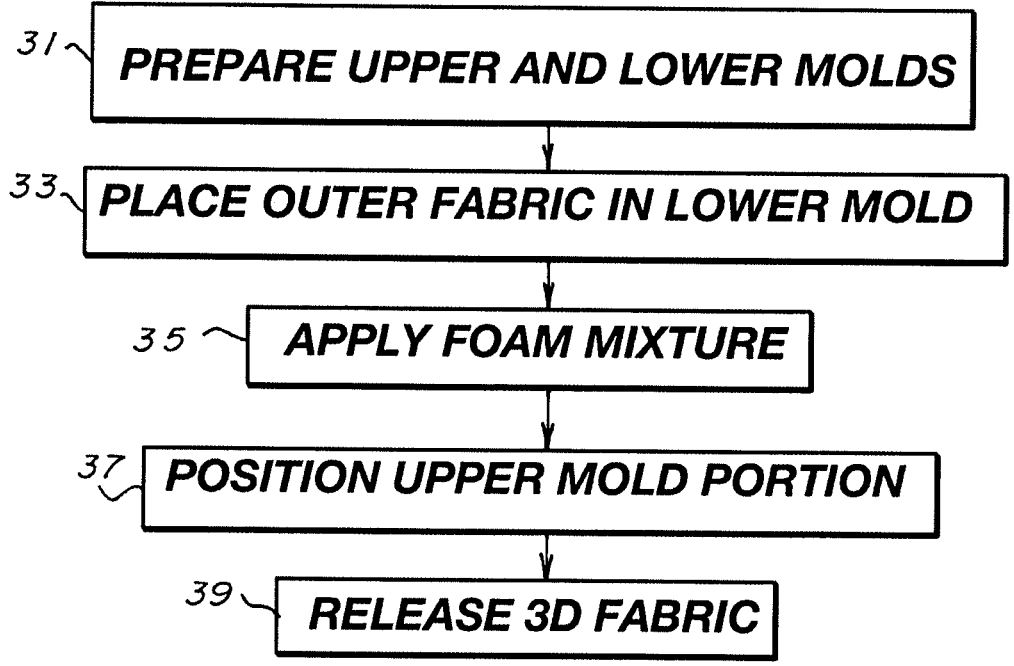
FIG. 3 depicts an embodiment of a method of making the 3D fabric.

The properties of the foam mixture dictate certain aspects of the manufacturing process. FIG. 3 describes the steps in an embodiment of a method for making the 3D fabric 5 or 26. Step 31 requires preparing an upper mold (e.g., portion 24 in FIG. 2 or portion 40 in FIG. 8) and a lower mold, (e.g., portion 22 in FIG. 2 or portion 38 in FIG. 8). Step 33 requires placing an outer fabric 8 or 28 in the lower mold 22 or 38 with the outer surface of the outer fabric facing downwards. Step 35 requires then applying foam mixture on top of the outer fabric. Step 37 requires positioning the upper mold 24 or 40 before the end of the rise time. Step 39 requires releasing the 3D fabric 5 or 26 from the mold. While this relatively simple process is at the core of the technology, almost unlimited variations are possible in the making of the 3D fabric 5 or 26, the 3D fabrics produced from the process, and the articles that can be made using the 3D fabric.

Because of the density and viscosity of the foam mixture, it is presently preferable that the foam mixture be applied to the top of the outer fabric layer. This can be done manually, though mixing of the components of the foam mixture and application of the foam mixture over the outer fabric layer are preferably done by machine. A variety of mixing heads are presently available to mix the components. Specialty automated processes and robots may be designed to apply the foam mixture in desired amounts at particular points depending on the desired product. If the dimensional layer is to be of uniform thickness as in FIG. 7, the foam mixture is applied uniformly over the outer fabric layer. If the dimensional layer is to be of variable thickness as in FIGS. 1 and 6, it may be advantageous to apply the foam mixture proportionally according to the thickness required by the distance between the upper and lower molds (e.g., areas with raised features).

Though it is presently preferred to produce the 3D fabrics by applying the foam mixture to the bottom of the outer fabric layer, it is also possible to produce the fabrics by applying the foam mixture to the top of an inner fabric layer and then apply the outer fabric layer over the foam mixture, allowing the foam mixture to rise to fit the contours of a contoured upper mold. Further, it is possible to produce the 3D fabrics in an arrangement where the inner and outer fabric layers are vertical and the foam mixture is applied between them in a continuous process.

Manufacture of 3D fabrics may be done by producing individual sheets having defined sizes using substantially planar fixed molds as depicted in FIGS. 2 and 8. In a presently preferred method, after the upper and lower molds are prepared, the outer fabric layer is placed with its outer side down onto the lower mold. Optionally, the outer fabric layer is fitted closely to the lower mold by air jets, vacuum, or forcing the fabric into place with a positioning plate that matches the contours of the lower mold. (the positioning plate may be same piece as the upper mold). Then the foam mixture is applied over the outer fabric layer, either by hand or by automated processes employing metering pumps, mix heads, robots, and/or computer controlled dispensing rates. Optionally, an inner fabric layer is placed over the foam mixture. Before the end of the rise time, the upper mold is applied at a defined distance from the lower mold to confine the dimensional layer. When the polymerization reaction is sufficiently complete, the 3D fabric is released from the mold.

Figure 5:
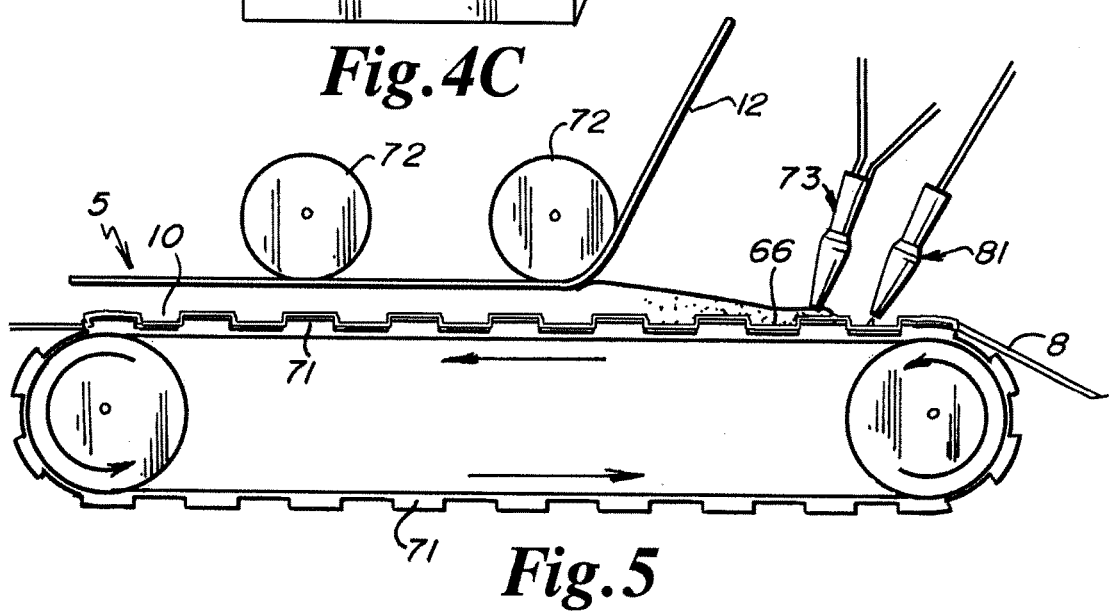
FIG. 5 depicts an embodiment of a mold for making the 3D fabric in a continuous process.

Manufacture of the 3D fabric 5 or 26 may also be performed in a continuous process, as shown in FIG. 5. The continuous process uses moving molds where one or both of the molds is contoured, continuous feeds of outer layer fabric and inner layer fabric, and continuous application of foam mixture. Because the polyurethane polymerization process requires substantial time, the rate of the continuous process is limited. However, the use of increased temperatures and catalysts can speed the polymerization process so that reasonable output is achievable. The continuous process preferably uses a horizontal orientation as shown in FIG. 5, though vertical and intermediate configurations are within the scope of the invention.

Referring to FIG. 5 (not to scale), lower mold portion 71 comprises a continuously moving track. Lower mold portion 71 may be made of flexible material or segmented metal. Outer fabric layer 8 is fed onto lower mold portion 71. Optional air jet 81 conforms outer fabric 8 to the contours of lower mold portion 71. Foam mixture 66 is applied onto the outer fabric layer 8 by foam mixture applicator 73. Foam mixture applicator 73 may comprise a single dispensing head that moves laterally across the lower fabric, or a plurality of dispensing heads that may be fixed or movable. The rise time of foam mixture 66 progresses as it is carried along by lower mold portion 71. When the rise time has progressed sufficiently, the foam mixture reaches the upper mold portion 72, which may comprise one or more rotating drums 72. At that point, dimensional layer 10 is confined by the molds as the rise period/rise time completes. The speed of the lower mold portion 71 is designed so that polymerization is substantially complete by the time the fabric 8 is past the upper mold portion 72. Temperature, catalysts, foam mixture and track and drum rotation speeds are calibrated to produce a 3D fabric 5 with the required properties as described elsewhere in this specification. Finished 3D fabric 5 comes through the mold with the rise time complete and the dimensional layer in its final form. Though FIG. 5 illustrates the continuous process in the presently preferred embodiment of having a dimensional mold portion 71 on the bottom and a flat mold portion 72 above, the arrangement of inner 12 and outer 8 fabrics as well as the selection and arrangement of the mold portions may be varied as described elsewhere in this specification. The incorporation of optional inner fabric layer 12 may be included in the process.

It is essential to the invention that the outer fabric layer 8 and the dimensional layer 10 are integrally bonded to each other. If an inner fabric layer 12 is present, the inner fabric layer 12 is also preferably integrally bonded with the dimensional layer 10. In a presently preferred embodiment, such bonding is achieved by the molding process. The outer fabric layer 8 is preferably breathable and porous, allowing adhesion of the fabric layer and foam mixture before the foam mixture sets. When the resin sets and forms the dimensional layer, it also binds the dimensional layer 10 to the outer fabric layer 8. The dimensional layer 10 is preferably an open-cell foam. Polyurethane at a density of about three pounds per cubic foot is a preferable material for its lightness, washability, breathability, and durability.

Bleeding and staining are two potential problems in the manufacturing of the 3D fabrics of the invention. Bleeding results in the foam mixture penetrating the outer layer before the polymerization reaction is complete, and results in visible foam on the outer surface of the fabric. Staining is less obvious than bleeding, but results in discoloration of the outer fabric layer. Several variables may affect these problems. The variables include: 1. type of fabric (cotton, polyester, blend, etc. . . . ); 2. Porosity of fabric (woven vs. knit, tightness of weave or knit, thread count, etc. . . . ); 3. Fabric treatments (waterproofing, starch, etc. . . . ); 4. type of foam mixture; 5. amount of foam mixture; 6. timing and temperature during molding; 7. pressure on foam during molding; and 8. use of catalysts or other chemical additives in the foam mixture. As described in the examples, tests have been carried out to determine the effects of these variables.

Based upon the test results described in the examples, fabrics may be placed in one of several categories. "High porosity" fabrics are those having significant bleed-through during the molding process with no pressure exerted by an upper mold portion. "Medium porosity" fabrics are those means having no significant bleed-through with no pressure, but significant bleed-through under low pressure. "Low porosity" fabrics are those having no significant bleed-through during the molding process under low pressure. "Impermeable" fabrics are those that have no significant bleed-through under high pressure. Though high porosity and medium porosity fabrics are useful for some applications of the invention, for applications where the prevention of bleed-through is important as well as breathability, the most preferred fabrics are low porosity fabrics including: tightly-woven synthetic microfibers, tightly-knit synthetic microfibers, tightly-woven natural microfibers, tightly-knit natural microfibers, and tightly-woven cotton/polyester blends with a thread count above 150. Such preferences apply to both the inner fabric layer and the outer fabric layer. Specifically preferred fabrics for the outer layer include Amerisuede 2-bar 100% polyester with a warped knit and brushed face and a weight of 220 grams per square meter, Amerisuede 3-bar 100% polyester with a warped knit and brushed face and a weight of 280 grams per square meter and 100% polyester knit fleece.

During the rise time, the pressure exerted by the mold portions against the polyurethane is dependent upon a number of factors. Though it is possible to control the mold portions to a set pressure point, in practice it is preferable to rigidly fix the distance between the mold portions. In such an arrangement, the pressure exerted against the mold portions by expansion of the foam mixture during the rise time is dependent upon the amount of foam mixture applied and the reaction conditions. It is presently preferred that foam mixture be applied in amount so the that the reaction conditions result in a pressure against the mold portions during the rise time between about 0.02 psi and 0.10 psi, and more preferably between about 0.03 psi and 0.06 psi. Selection and application of the foam mixture must also result in a dimensional layer of the desired density.

Presently preferred polyurethanes include 3 lb. Flex-Foam-iT!® by Smooth-On.

The molding process can be carried out in a variety of ways, depending on the requirements of the application. The basic requirements are: (1) a dimension portion of the compression mold; (2) a second portion of the compression mold, which may be flat as in FIG. 2 or may itself be dimensional as in FIG. 8; (3) providing an outer fabric layer; (4) providing foam mixture to form the dimensional layer; (5) compressing the two portions of the mold during the rise time; and (6) releasing the 3D fabric from the mold.

Silicon molds may be used low volume applications of the manufacturing process. For high volume applications, especially where temperature control is critical, molds made of metals such as aluminum are preferable.

EXAMPLES

Example 1

Fabric Testing

Figure 4A:
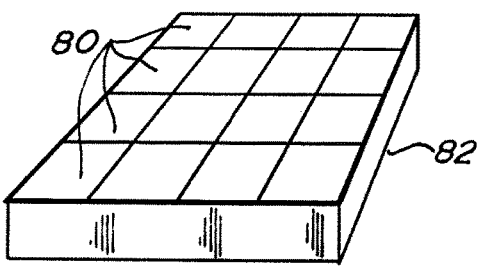
FIG. 4A-4C depicts a testing method for compatibility of fabrics with foam mixtures and reaction conditions.
Figure 4B:
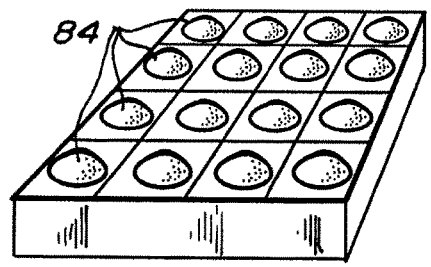
Figure 4C:
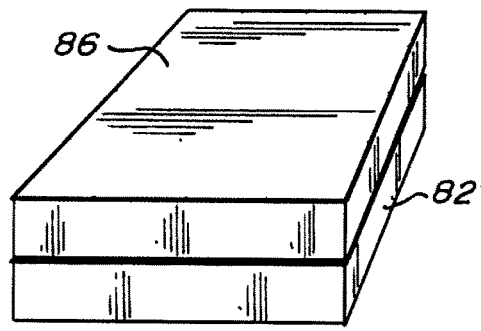

Various fabrics were tested for their suitability and limitations for use in this invention. Referring to FIG. 4, three-by-five inch patches of the fabrics to be tested ("fabric test patches") 80 were arrayed on the surface of a flat lower mold 82. A dimensional mold was not used in these tests. Foam mixture 84 was prepared and applied to each of the squares in defined amounts 84. During the rise time, flat upper mold 86 was applied at a defined pressure and for a second defined time (the "mold period"). The upper mold 86 was then removed, and each of fabric test squares 80 were scored on a scale of 1-10 (1=worst, 10=best) or otherwise rated for stain resistance and bleed resistance, the thickness of the dimensional layer was measured, and the pressure applied was calculated. Tests were also performed without the upper mold being applied (weight=0). Tests were done at room temperature. The results of the tests are indicated in Table 1 below.

In Table 1, the following abbreviations are used as column headings:

In the notes column, G=no bleed-though or staining, W=bleed-through, B=staining
Grams=grams of foam resin applied to the patch
T=thickness of dimensional layer
Rise=rise period
Mold=mold period
Weight=total weight of the upper mold portion (used to calculate pressure in pounds/square inch or psi)
SR=stain resistance (10 is best, 1 is worst)
BR=bleed resistance (10 is best, 1 is worst)
TR=thread count of the fabric

TABLE 1

Fabric Test Results

| FABRIC TYPE | notes | grams | T | rise | mold | weight | SR | BR | TC |
|---|---|---|---|---|---|---|---|---|---|
| Amerisuede | G | 3.4 | | 1:50 | 7 MIN | 0 | 10 | 10 | |
| Amerisuede | G | 3.4 | | 1:50 | 7 MIN | 2.5 | 10 | 10 | |
| Amerisuede | W | 3.4 | | 1:50 | 7 MIN | 7.85 | | | 80 |
| 2-Bar | G | 3.4 | | 1:50 | 7 MIN | 0 | 1 | 10 | |
| 2-Bar | G | 3.4 | | 1:50 | 7 MIN | 2.5 | 1 | 10 | |
| 2-Bar | W | 3.4 | | 1:50 | 7 MIN | 7.85# | 1 | 10 | 80 |
| Plain Weave | B | 3.4 | | 1:50 | 7 MIN | 0 | 10 | 10 | |
| Plain Weave | G | 3.4 | | 1:50 | 7 MIN | 2.5 | 10 | 10 | |
| Plain Weave | W | 3.4 | | 1:50 | 7 MIN | 7.85 | | | 80 |
| RT Twill 100 cot | B | 3.4 | | 1:50 | 7 MIN | 0 | 4 | 0 | |
| RT Twill 100 cot | B | 3.4 | | 1:50 | 7 MIN | 2.5 | 4 | 0 | |
| RT Twill 100 cot | B | 3.4 | | 1:50 | 7 MIN | 7.85 | 4 | 0 | ? |
| OL sweatshirt 100 poly | W | 3.4 | | 1:50 | 7 MIN | 0 | | | |
| OL sweatshirt 100 poly | | 3.4 | | 1:50 | 7 MIN | | 0 | 0 | |
| OL sweatshirt 100 poly | | 3.4 | | 1:50 | 7 MIN | 7.85 | 0 | 0 | 0 |
| Gen. Fleece 100 poly | G | 3.4 | | 1:50 | 7 MIN | 0 | | | |
| Gen. Fleece 100 poly | B | 3.4 | | 1:50 | 7 MIN | 2.5 | | | |
| Gen. Fleece 100 poly | B | 3.4 | | 1:50 | 7 MIN | 7.85 | 1 | 1 | 0 |
| RT Jersey 100 cot | B | 3.4 | | 1:50 | 7 MIN | 0 | | | |
| RT Jersey 100 cot | W | 3.4 | | 1:50 | 7 MIN | 2.5 | | | |
| RT Jersey 100 cot | W | 3.4 | | 1:50 | 7 MIN | 7.85 | | | 65 |
| Gen. Knit 60 cot 40 poly | W | 3.4 | | 1:50 | 7 MIN | 0 | | | |
| Gen. Knit 60 cot 40 poly | | 3.4 | | 1:50 | 7 MIN | 2.5 | | | |
| Gen. Knit 60 cot 40 poly | | 3.4 | | 1:50 | 7 MIN | 7.85 | | | 100 |
| RT Shirting 100 cot | B | 3.4 | | 1:50 | 7 MIN | 0 | | | |
| RT Shirting 100 cot | W | 3.4 | | 1:50 | 7 MIN | | | | |
| RT Shirting 100 cot | W | 3.4 | | 1:50 | 7 MIN | 7.85 | | | 65 |
| MO Twill 55 cot 45 poly | B | 3.4 | | 1:50 | 7 MIN | 0 | | | |
| MO Twill 55 cot 45 poly | B | 3.4 | | 1:50 | 7 MIN | | | | |
| MO Twill 55 cot 45 poly | B | 3.4 | | 1:50 | 7 MIN | 7.85 | | | 60 |
| RT brushed cot 100 cot | W | 3.4 | | 1:50 | 7 MIN | 0 | | | |

TABLE 1-continued

Fabric Test Results

| FABRIC TYPE | notes | grams | T | rise | mold | weight | SR | BR | TC |
|---|---|---|---|---|---|---|---|---|---|
| RT brushed cot 100 cot | | 3.4 | | 1:50 | 7 MIN | | | | |
| RT brushed cot 100 cot | | 3.4 | | 1:50 | 7 MIN | 7.85 | | | 70 |
| MO Twill 7 oz 55 cot 45 po | B | 3.4 | | 1:50 | 7 MIN | 0 | | | |
| MO Twill 7 oz 55 cot 45 po | B | 3.4 | | 1:50 | 7 MIN | 2.5 | | | |
| MO Twill 7 oz 55 cot 45 po | B | 3.4 | | 1:50 | 7 MIN | 7.85 | | | 75 |
| Gen. Heavy cot 100 cot | B | 3.4 | | 1:50 | 7 MIN | 0 | | | |
| Gen. Heavy cot 100 cot | B | 3.4 | | 1:50 | 7 MIN | 2.5 | | | |
| Gen. Heavy cot 100 cot | B | 3.4 | | 1:50 | 7 MIN | 7.85 | | | 90 |
| Next Vista 8 oz cot 100 cot | B | 3.4 | | 1:50 | 7 MIN | 0 | 3 | 10 | |
| Next Vista 8 oz cot 100 cot | W | 3.4 | | 1:50 | 7 MIN | 2.5 | 3 | 10 | |
| Next Vista 8 oz cot 100 cot | W | 3.4 | | 1:50 | 7 MIN | 7.85 | 3 | 10 | 85 |
| Vista Taslon ripstop 100 poly | W | 3.4 | | 1:50 | 7 MIN | 0 | | | |
| Vista Taslon ripstop 100 poly | | 3.4 | | 1:50 | 7 MIN | 2.5 | | | |
| Vista Taslon ripstop 100 poly | | 3.4 | | 1:50 | 7 MIN | 7.85 | | | 0 |
| Nylon trad. 100 nylon | W | 3.4 | | 1:50 | 7 MIN | 0 | | | |
| Nylon trad. 100 nylon | | 3.4 | | 1:50 | 7 MIN | 2.5 | | | |
| Nylon trad. 100 nylon | | 3.4 | | 1:50 | 7 MIN | 7.85 | | | 0 |
| Bug Mesh poly/nylon blend | W | 3.4 | | 1:50 | 7 MIN | 0 | | | |
| Bug Mesh poly/nylon blend | | 3.4 | | 1:50 | 7 MIN | 2.5 | | | |
| Bug Mesh poly/nylon blend | | 3.4 | | 1:50 | 7 MIN | 7.85 | 0 | 0 | 0 |
| Glacier Gray Fleece 100 poly | G | 3.4 | | 1:50 | 7 MIN | 0 | | | |
| Glacier Gray Fleece 100 poly | B | 3.4 | | 1:50 | 7 MIN | 2.5 | | | |
| Glacier Gray Fleece 100 poly | B | 3.4 | | 1:50 | 7 MIN | 7.85 | | | 0 |
| outerwear w/P.U. coat 100 poly | G | 3.4 | | 1:50 | 7 MIN | 0 | | | |
| outerwear w/P.U. coat 100 poly | | 3.4 | | 1:50 | 7 MIN | 2.5 | | | |
| outerwear w/P.U. coat 100 poly | G | 3.4 | | 1:50 | 7 MIN | 7.85# | | | 0 |
| MO 65 poly 35 cot | B | 3.4 | | 1:50 | 7 MIN | 0 | | | |
| MO 65 poly 35 cot | W | 3.4 | | 1:50 | 7 MIN | 2.5 | | | |
| MO 65 poly 35 cot | W | 3.4 | | 1:50 | 7 MIN | 7.85 | | | 75 |
| Tan Duck 100 cot (from Natalie) | B | 3.4 | | 1:50 | 7 MIN | 0 | 6 | 6 | |
| Tan Duck 100 cot (from Natalie) | W | 3.4 | | 1:50 | 7 MIN | 2.5 | 6 | 6 | |
| Tan Duck 100 cot (from Natalie) | W | 3.4 | | 1:50 | 7 MIN | 7.85 | 6 | 6 | ? |
| Satin (Outlier 1) | | | — | 1:50 | 7 MIN | — | — | — | ? |
| Silk (Outlier 2) | | | — | 1:50 | 7 MIN | — | — | — | ? |

The test results showed that most of the fabrics varied significantly (i.e., had bleed-through or staining) even without the upper mold being applied. Others failed with a low pressure (currently calculated to be about 0.03 psi) being applied. Most of the fabrics tested failed at a high pressure (currently calculated to be over 0.10 psi) being applied. Though the pressure applied may be measured and calculated to classify fabrics as described in this specification, fabric classification may also be done empirically by comparison between fabrics.

Figure 9A:
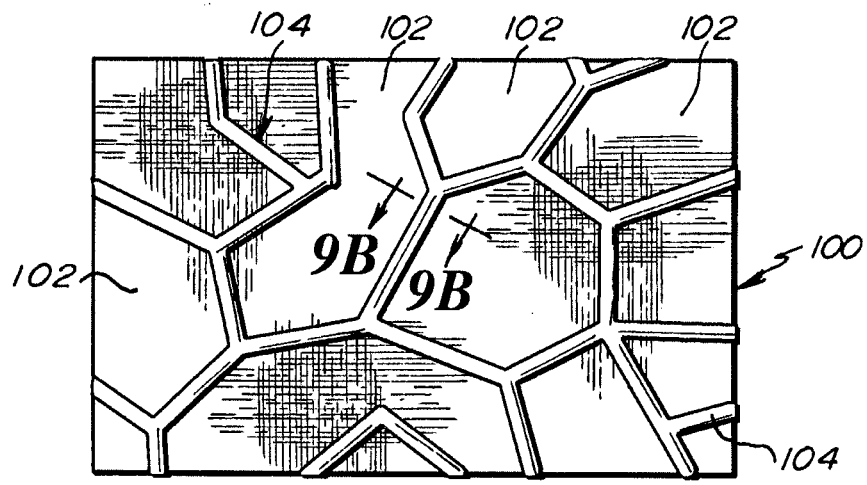
FIG. 9A depicts a top plan view of a third embodiment of a 3D fabric.
Figure 9B:
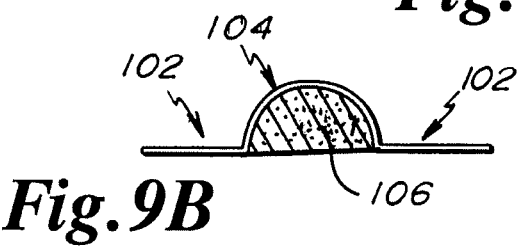
FIG. 9B depicts a cross section taken along lines 9B-9B of FIG. 9A and FIG. 10.

FIG. 9A (not to scale) depicts an outer-side view of a third embodiment of a 3D fabric 100. In the figure 3D fabric 100 has essentially flat areas 102 of unmodified traditional fabric 102, as well as "raised" or "3D" "veins" or "ridges" 104. FIG. 9B (not to scale) depicts a cross-sectional area of a portion of FIG. 9A (with the outer-side up). In FIG. 9B raised vein 104 is between two flat areas 102. The flat areas 102 consist of a layer of traditional outer fabric 102, while the raised vein 104 consists of an outer layer of traditional fabric 102 as well as a "dimensional" or "foam" layer 106. As viewed in FIG. 9B, the top side of traditional fabric 102 is the "outer" side, which may be printed with a (colored) pattern.

Figure 10:
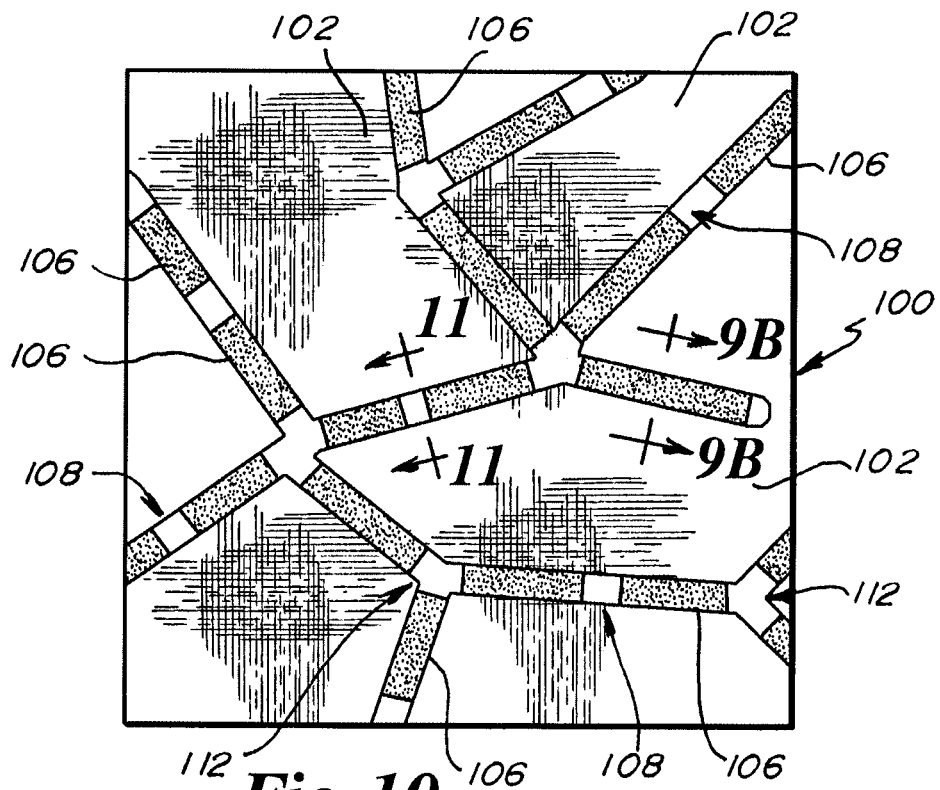
FIG. 10 depicts a bottom plan new of the third embodiment of the 3D fabric layer and the dimensional layer.
Figure 11:
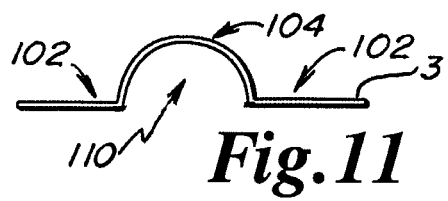
FIG. 11 depicts a cross section taken along lines 11-11 of FIG. 10.

FIG. 10 shows the bottom-side view of a first embodiment of a 3-D fabric 100. In the figure 3D fabric 100 has flat areas 102 as well as veins/ridges 104 as in FIG. 9A. However, from this view it is seen that the veins/ridges 104 are comprised of three separate and discrete types of segments. Foam segments 106 have both traditional fabric 102 as well as a foam layer 106, as depicted in FIG. 9B. Spacer segments 108 have cross-sections as depicted in FIG. 11. As can be seen in FIG. 11, the veins/ridges 104 of the spacer segments 108 are comprised only of a traditional fabric 102 layer, with an air space 110. Spacer segments 108 occur between two foam segments 106. The traditional fabric 102 in the spacer segments 108 takes its 3D shape from the adjoining foam segments 106, which tend to keep the traditional fabric 102 in the spacer segments 108 in a raised configuration. Referring now back to FIG. 10, it can be seen that the raised veins 104 are also comprised of hubs 112, which are similar to the spacer segments 108 in that they do not have a foam layer. However, hubs 112 occur at the intersection of three or more foam segments 106.

The overall effect of this third embodiment of the 3D fabric 100 is to present an outer surface 102 with a 3D pattern of ridges/veins 104, where the foam segments 106 are largely indistinguishable from the spacer segments 108 and the hubs 112 because of the tendency of the foam segments 106 to hold the traditional fabric 102 of the spacer segments 108 and the hubs 112 in a three-dimensional conformation.

The foam layer 106 is comprises a polymer foam. Polyurethane is a preferred material. Polyurethane foams are forms from reacting two components (isocyanate and polyol). When the two components are mixed, a polymerization reaction occurs. The reaction includes a period when the foam begins to expand and air pockets form. The time from the mixing to the time of the foam reaching its largest volume is the "rise time." After the rise time, the foam remains tacky and problematic to handle for a period. The time from the mixing to the time when the foam has lost its tackiness is called the tack free time.

Because of the density and viscosity of the foam mixture, it is preferable that the foam mixture be applied to the top of the outer fabric layer during manufacturing. This can be done manually, though mixing of the components of the foam mixture and application of the foam mixture over the outer fabric layer are preferably done by machine. A variety of mixing heads are presently available to mix the components. Specialty automated processes and robots may be designed to apply the foam mixture in desired amounts at particular points depending on the desired product.

Figure 12:
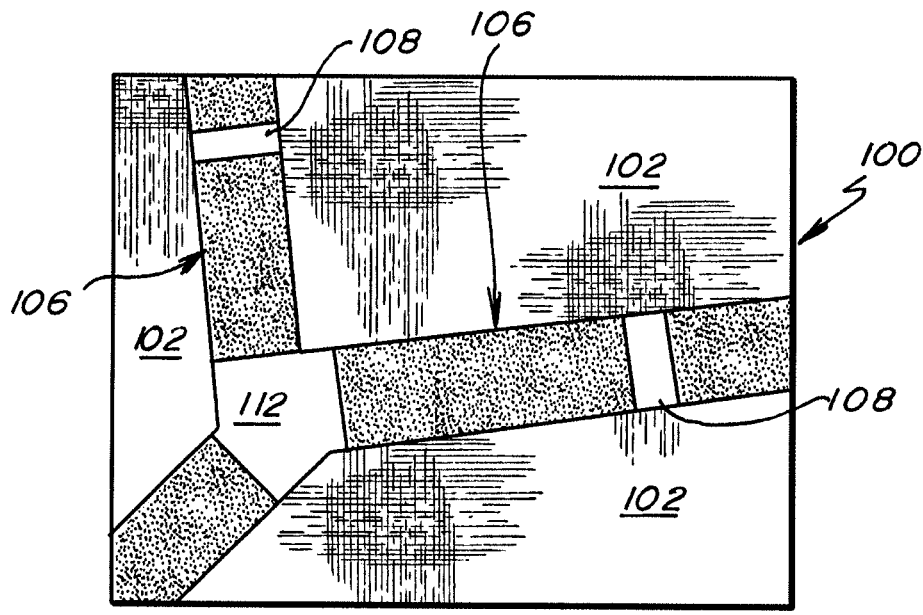
FIG. 12 depicts an enlarged bottom plan view of the outer fabric layer and the dimensional layer of the third embodiment of the 3D fabric.
Figure 13A:
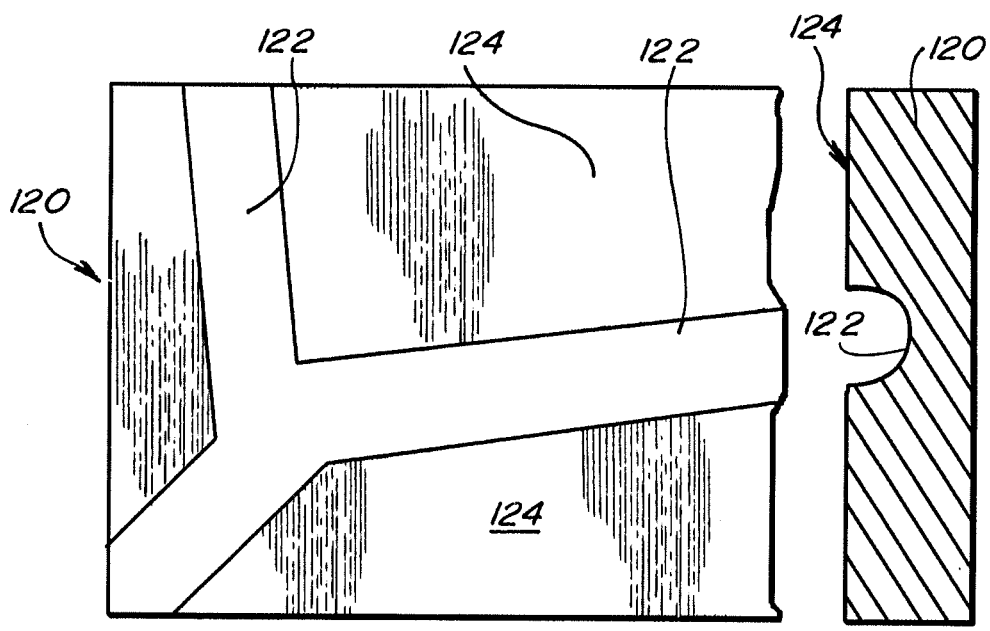
FIG. 13A depicts a top plan view of the bottom mold portion.
Figure 13B:
FIG. 13B depicts a side view of the bottom mold portion.

FIGS. 12-17 illustrate the manufacturing process for the third embodiment of the 3D fabric 100. FIG. 12 shows the bottom side of a portion of 3D fabric 102, similar to FIG. 10. The 3D fabric 102 has flat areas 102, dimensional layer segments 104, spacer segments 108 and hubs 112. Referring now to FIGS. 13A and 13B, mold 120 is seen from the top (FIG. 13A) and from the side (FIG. 13B). Mold 120 is mostly planar, with grooves 122 where the veins/ridges 104 will be formed. Mold 120 has flat areas 124 and grooves 122. The grooves 122 may be of variable width and depth, and need not be uniform.

Figure 14A:
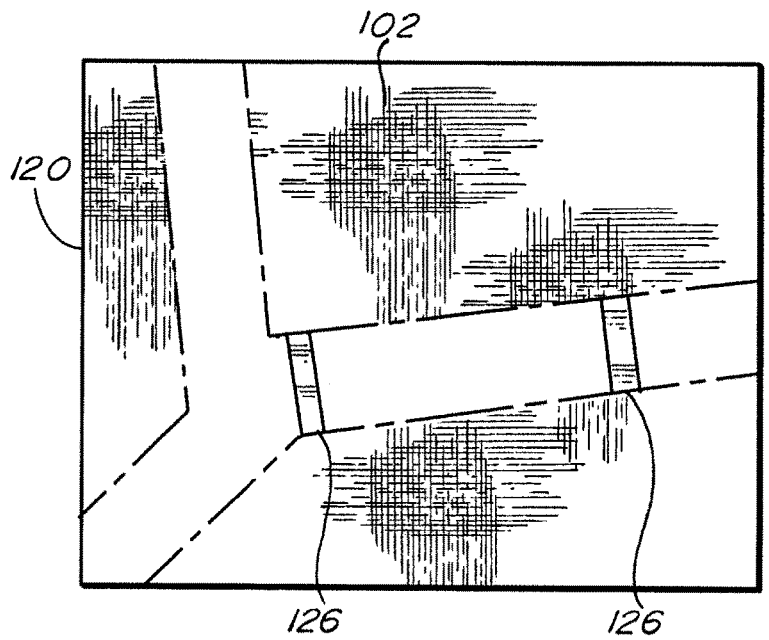
FIG. 14A depicts a top plan view of the bottom mold portion with the outer fabric in place.
Figure 14B:
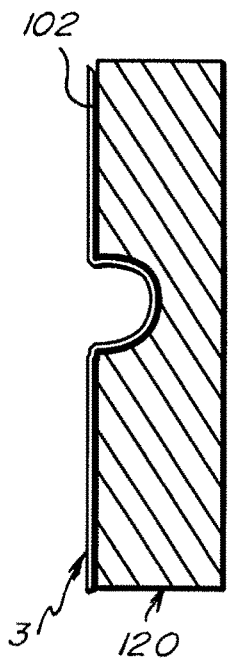
FIG. 14B depicts a side view of the bottom mold potion with the outer fabric in place.
Figure 15:
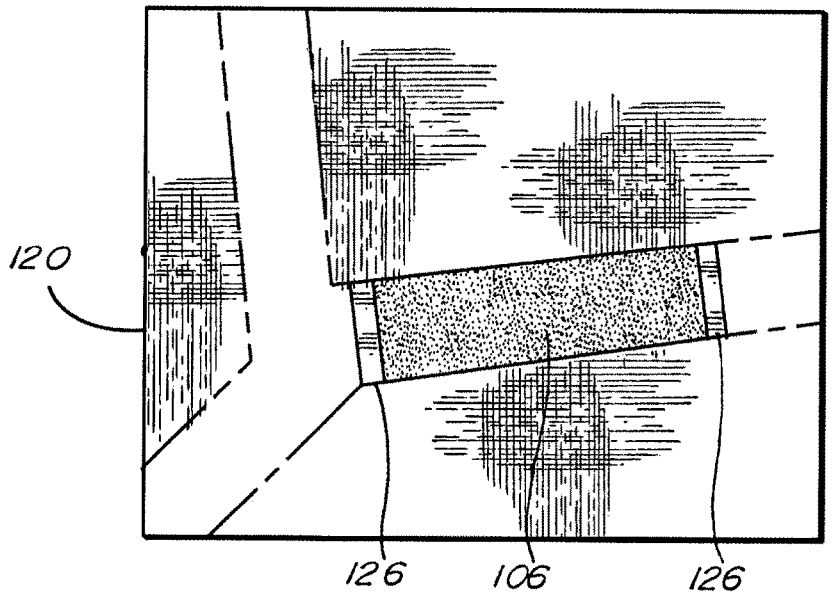
FIG. 15 depicts a top plan view of the bottom mold portion with the dimensional layer in place with fabric holders.
Figure 16:
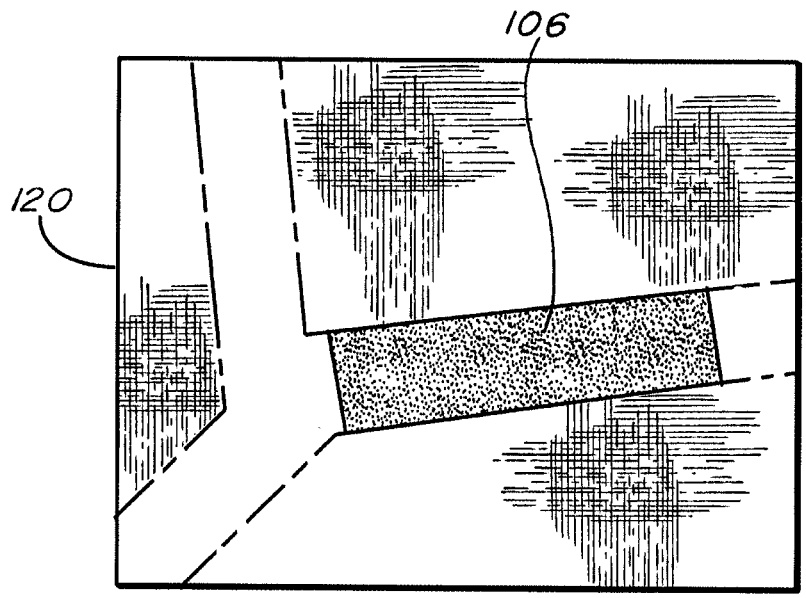
FIG. 16 depicts a top plan view of the bottom mold portion with the fabric holders removed.

The process begins by placing the outer fabric layer 102 pattern side down over the mold 120 and securing it in place. FIGS. 14A and 14B shows the fabric 102 held in place over the mold 120 from a top view (FIG. 14A) and side view (FIG. 14B). The dashed lines in FIG. 14A indicate the outlines of the grooves 122. The fabric 102 is held in place by fabric holders 126. By placing a fabric holder 126 at both ends of a future foam segment, the fabric 102 is held against the mold for the length of the segment. FIG. 15 shows the foam segment 106 after the foam mixture has been applied in the groove 122. The foam mixture is applied in the groove 122 in an amount so that, after the rise time, the top of the foam segments will be essentially level with the flat areas 102 of the fabric. Fabric holders 126 remain in place until the tack free time. At that time, the fabric holders 126 are removed from the ends of the foam segment 106 (FIG. 16).

Figure 17:
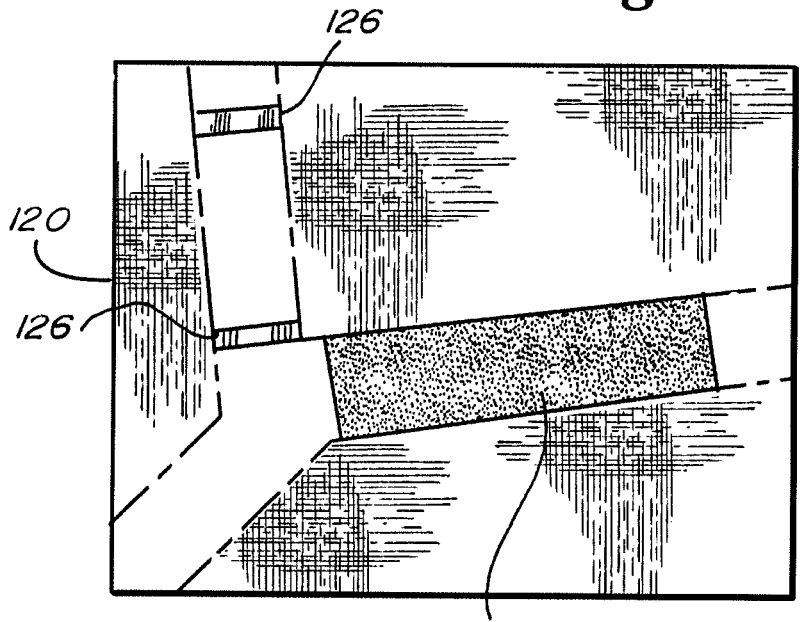
FIG. 17 depicts a top plan view of the bottom mold portion with new fabric holders in place.

Manufacture of the 3D fabric 100 requires fitting an essentially two dimensional traditional fabric 102 into a 3D shape 100. Stretching of the fabric 102 is not desirable because it may make the fabric more porous and lead to bleeding and/or staining. Another problem may be bunching of the fabric in certain areas, resulting in a less appealing appearance. To reduce and avoid stretching and bunching, it is sometimes desirable to form different foam segments 106 in a sequence as opposed to forming all of them at the same time. FIG. 17 illustrates this idea. Once foam segment 106 has reached the tack free time and the fabric holders 126 are removed from the ends of that segment, fabric holders 126 are applied for a new foam segment area.

The essential function of the fabric holders 126 is to keep the fabric 102 in contact with the groove 122 of the mold 120 when forming a foam segment 106. Because of the tackiness of the foam mixture before the tack free time, it is desirable to avoid the foam mixture from contacting the fabric holders 126.

Figure 18A:
FIGS. 18A-18E depict a variety of fabric holders.
Figure 18B:
Figure 18C:
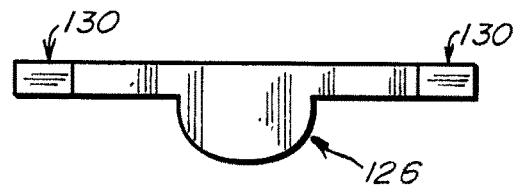
Figure 18D:
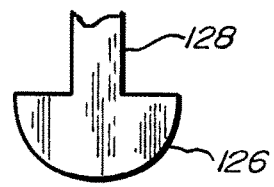
Figure 18E:
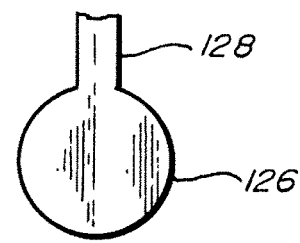

Fabric holders 126 can be designed in any configuration as long as they perform their function. FIG. 18 depicts a variety of fabric holders. FIG. 18A depicts the essence of a fabric holder 126, having a surface that holds the traditional fabric 102 against the groove 122 in a mold 120. FIG. 18B depicts a fabric holder 126 having projections to hold it in place over a mold. FIG. 18C depicts a fabric holder 126 with either a magnet or magnetic metal 130 in its projections. Such a fabric holder 126 may interact with magnets or magnetic metals in the mold to hold it in place. FIG. 18D depicts a fabric holder 126 of a presently preferred embodiment, in that the fabric holder is attached to an actuator arm 128 which allows robotic control and movement of the fabric holder. FIG. 18E depicts a fabric holder 126 in a configuration that allows it to be used in grooves of various sizes. In this embodiment, the business end of the fabric holder 126 may be deformable. Other shapes and designs of fabric holders 126 may be used in certain applications, e.g. holding the fabric 102 in hubs 112 where there is no uniform groove 122.

Figure 19:
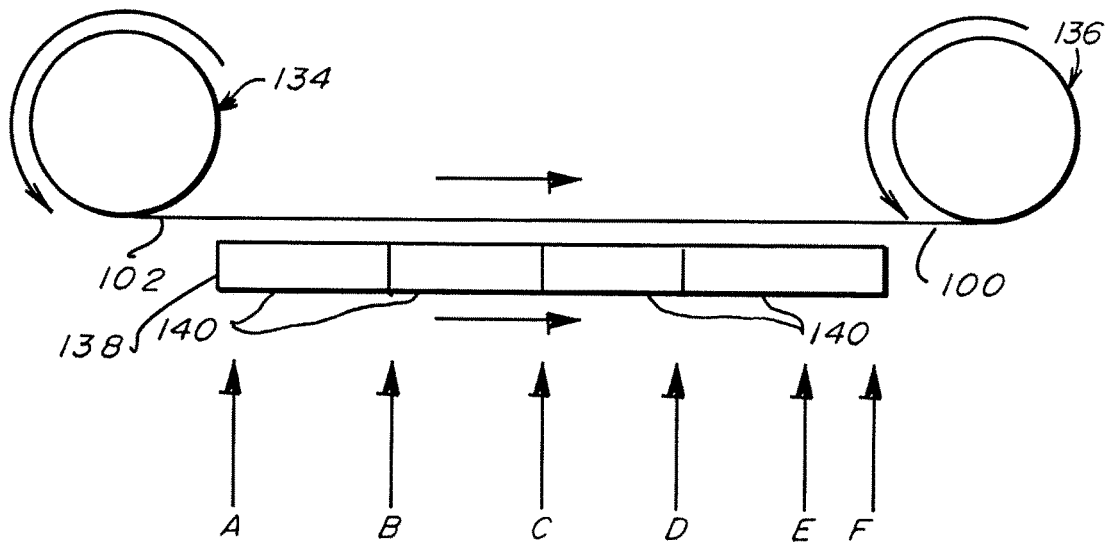
FIG. 19 depicts a process for manufacturing the 3D fabric.

Manufacture of 3D fabrics 100 may be done by producing individual sheets having defined sizes. For large scale production, however, it is desirable that the manufacture of the 3D fabric 100 be performed in a continuous process, as shown in FIG. 19. The process begins will a roll 136 of traditional fabric 102 and ends with a roll 136 of 3D fabric 100. At the beginning of the process the traditional fabric 102 is unrolled and placed on movable molding table 138. Moveable molding table 138 may be comprised of mold segments 140 that travel with the fabric 102 from point A to point Z as the molding process is performed. As molding table 138 moves, mold segments 140 must be placed at or around point A and removed at or around point Z. Along the way from point A to point Z, at various other points (e.g. B, C, D, E), the steps shown in FIGS. 14-17 are performed. The minimum time for the fabric 102 to travel from point A to point Z is slightly longer than the tack free time of the foam. However, because it is desirable to mold foam segments in a staggered fashion, the time from point A to point Z may be two or three times as long as the tack free time. The use of increased temperatures and catalysts can speed the polymerization process and reduce the time from point A to point Z.

The operations shown in FIGS. 14-17 are performed from above the molding table 138. They may be performed manually, but in a preferable embodiment the operations are performed by computer controlled robots and the foam mixture is dispensed and metered by automatic mixers and applicators.

It is essential to the invention that the outer fabric layer 102 and the dimensional layer 106 are integrally bonded to each other. Such bonding is achieved by the molding process. The outer traditional fabric layer 102 is breathable and porous, allowing adhesion of the fabric layer and foam mixture before the foam mixture sets. When the foam mixture sets and forms the dimensional layer 106, it also binds the dimensional layer 106 to the outer fabric layer 102. The dimensional layer 106 is preferably polyurethane. Polyurethane at a density of about or below three pounds per cubic foot is a preferable material for its light weight, washability, and durability. Presently preferred polyurethanes include 3 lb. FlexFoam-iT!® by Smooth-On.

The polymer foam may be a closed-cell foam to deter the foam from taking on moisture. The polymer foam may be breathable. However, since the 3D fabric 100 has flat areas 102 without foam, the overall fabric may still be breathable even though the foam segments are not.

The hubs 112 and spacer segments 108 of the 3D fabric 100 allow for flexibility and comfort when the fabric is incorporated into items of apparel. Without the hubs 112 and spacers 108, a similar 3D fabric would be somewhat rigid. The hubs 112 and spacers 108, combined with relatively short vein segments 104, allow the fabric to conform to the contours of the body and easily bend with movement. Flexibility of the foam component also contributes to flexibility of the overall 3D fabrics 100. Low density, flexible foams are highly preferable to high density, rigid foams in this regard. Example 2 describes stiffness testing of a preferred embodiment of the invention. A ǩ value may be calculated from the example. It is presently preferable that the veins of the 3D fabrics of the invention are between about 0.5 and 2.0 times the ǩ value in example 2.

Example 2

Stiffness Testing

A body may have a rotational stiffness, k, given by $$k = \frac{M}{\theta}$$

where
M is the applied moment
θ is the rotation. (from Wikipedia)
A prototype 3D fabric 100 having acceptable flexibility was tested for stiffness. The vein segment 104 tested included the outer fabric layer 102 and the foam layer 106. The vein segment 104 was about ¼ inch in diameter (thickness) and 4 inches in length. The fabric 102 was Amerisuede and the foam 106 was Flex Foam-It III (Closed cell polyurethane 3 lb density). The vein segment was easily compressible and bendable.

In the testing, one end of the vein segment 104 was secured and the rest of the segment was unsupported. Quarters were placed on the vein segment 104 two inches from the secured end and the resulting bending was measured. The weight of each quarter was about 5.67 grams. The first quarter resulted in a 5 degree angle. Each subsequent quarter produced an additional 5 degrees of bending as follows: 2 quarters=10 degrees, 3 quarters=15 degrees, etc. A maximum of 6 quarters were added, which produced a 30 degree angle.

When used for ordinary items of apparel, the 3D effect invites touching. Softness of the outer fabric 102 is also important to the invention. Preferable 3D fabrics 100 are soft to the touch because of the qualities of the traditional fabric layer.

220 grams per square inch Amerisuede (universal name is 3-bar) having a brushed polyester outer layer is an acceptably soft outer fabric. Preferable outer fabrics for use with the invention are at least as soft as this fabric.

For applications where the prevention of bleed-through and staining are important, preferred fabrics include: tightly-woven synthetic microfibers, tightly-knit synthetic microfibers, tightly-woven natural microfibers, tightly-knit natural microfibers, and woven cotton/polyester blends with a thread count above 150. "Tightly-woven" means impermeable to the foam mixture at a rise-time pressure less than about 0.10 psi. Specifically preferred fabrics include Ultrasuede and 100% polyester knit fleece.

Silicon molds may be used for low volume applications of the manufacturing process. For high volume applications, especially where temperature control is critical, molds made of metals such as aluminum are preferable.

The 3D fabrics 5, 26 and 100 of the invention are easily sewable using conventional equipment, as the dimensional layer is compressible during the sewing process. However, in some applications where thick dimensional layers are desired in portions of the fabric, it may be desirable to design and manufacture the fabric to have thinner areas of the dimensional layer in accordance with desired applications.

The 3D fabrics of the invention have a wide variety of applications. They may be used for camouflage hunting apparel. They may be used for military camouflage apparel. They may be used for producing ordinary apparel (such as coats, pants, hats, shoes, etc. . . . ) with interesting visual effects. They may be used for producing ordinary apparel for their insulating properties. They may be used for furniture coverings. They may be used in wall coverings. They may be used in set designs. Specialty outer and inner fabric layers may be incorporated for properties such as sonic insulation, thermal insulation, heat retention, heat reflectivity, indetectability to remote sensors (radar, sonar, infra-red detectors, and the like). Electronics may be molded into the dimensional layer for purposes of communication, monitoring of body functions, lighting and the like). Other applications of the fabrics will also become apparent over time.

The present invention includes materials and methods to produce unique wearable three-dimensional (3-D) fabrics. The fabrics comprise a dimensional layer made of foam and an outer layer of traditional fabric, which may be patterned or dyed. The dimensional layer may be molded to have contours matching the pattern of the outer layer, with the resulting multilayer fabric having both physical and graphical depth.

One application of this technology is to create camouflaged clothing articles. For example, a suit comprising a jacket and pants may have a tree or woods motif, where the fabric is specifically contoured to provide physical depth to graphically patterned branches and leaves. Preferably, the depth of the veins of the 3D fabric varies from about 0.25 inches to about 4.0 inches, and more preferably from about 0.25 inches to about 2.0 inches. Outer fabric layer patterns may include trees, leaves, branches, grassland vegetation, and the like. The patterns may be selected from different types of outdoor environments: oak woods, pine forests, maple forests, and the like.

In a presently preferred embodiment, the printed or graphical patterns on the outer fabric layer are selected or designed to match the physical depth of the 3D fabric, i.e., a printed branch on the pattern will correspond with the shape of the branch on the 3D fabric. This is useful for camouflage and other applications. However, it is within the scope of the invention to have 3D physical patterns that do not match the graphical patterns.

In one aspect, the invention is a three-dimensional fabric 100 comprising: a traditional fabric outer layer 102; and a dimensional layer 106 formed of polymer foam integrally bonded with the outer layer 102, said dimensional layer 106 having a variable thickness, where the 3D fabric 100 has flat areas without a dimensional layer 106, vein segments 104 having a dimensional layer 106, and spacer segments 108 without a dimensional layer between the vein segments. The dimensional layer 106 preferably has a (optionally) variable thickness between about 0.25 and 4.0 inches. The dimensional layer more preferably has a (optionally) variable thickness between about 0.25 and 2.0 inches. The density of the foam is preferably between about 1 and 4 pounds per cubic feet. The density of the foam is more preferably between about 2.5 and 3.5 pounds per cubic feet. The stiffness of the vein segments 104 is preferably between about 0.5 and 4 times the ǩ value calculated from example 1. The stiffness of the vein segments is more preferably between about 0.5 and 2 times the ǩ value calculated from example 1. The vein segments 104 are preferably between about 1 and 8 inches in length. The vein segments 104 are more preferably between about 2 and 5 inches in length. The spacer segments 108 are preferably between about 0.5 and 2 inches in length. The spacer segments 108 are more preferably between about 0.5 and 1 inch in length. The outer layer 102 may plain-colored. The outer layer may have be patterned. The pattern may have graphical depth. The physical depth of the dimensional layer may match the graphical depth of the pattern. The fabric may further comprise hub segments 112. The outer side of the traditional fabric layer is preferably at least as soft to the touch as 220 grams per square inch Amerisuede (universal name is 3-bar) having a brushed polyester outer layer.

A fourth embodiment of this invention's 3D fabric and method of making is shown in FIGS. 20 through 30 and described hereat. The method will be described first to appreciate how the fourth embodiment is manufactured and its physical construction.

Figure 20:
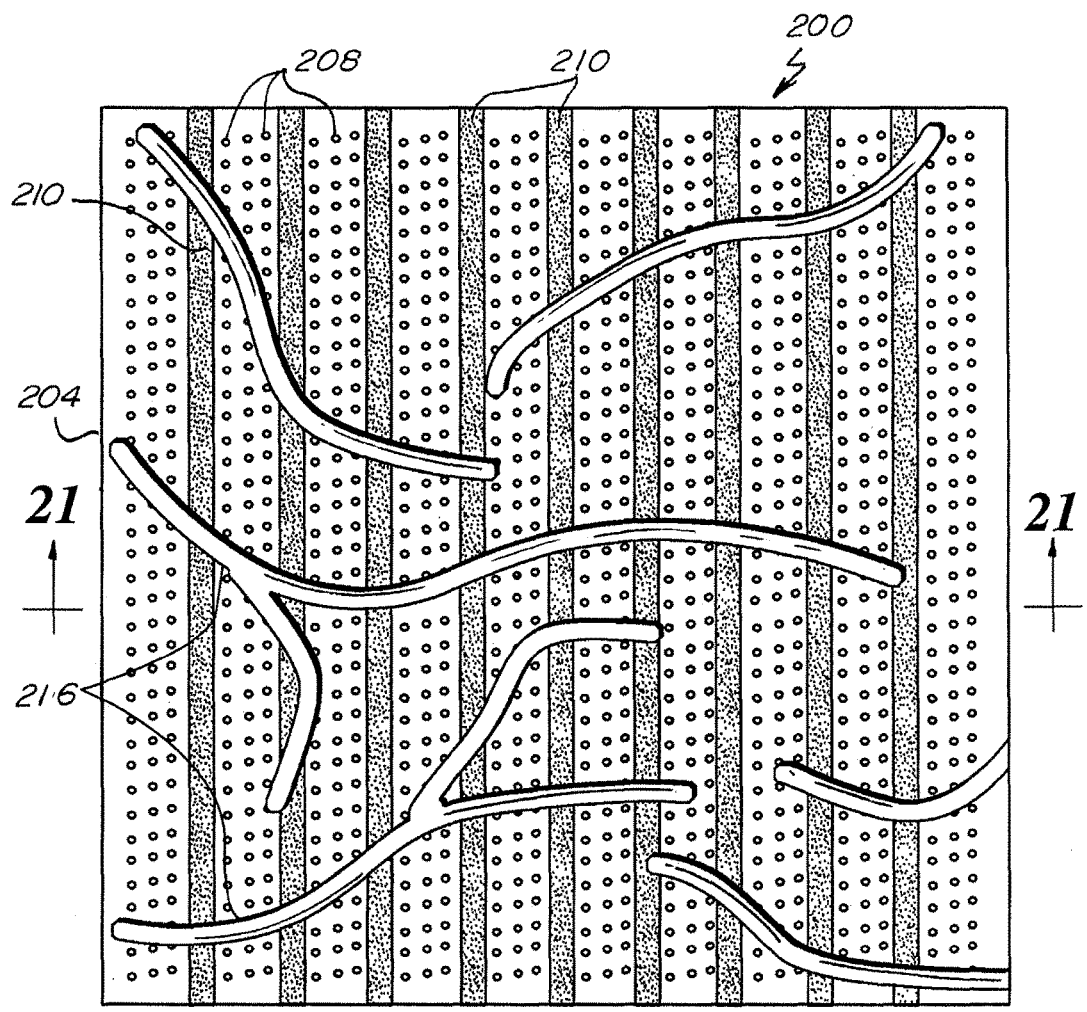
FIG. 20 depicts a master mold for manufacturing a fourth embodiment of a 3D fabric.
Figure 21:
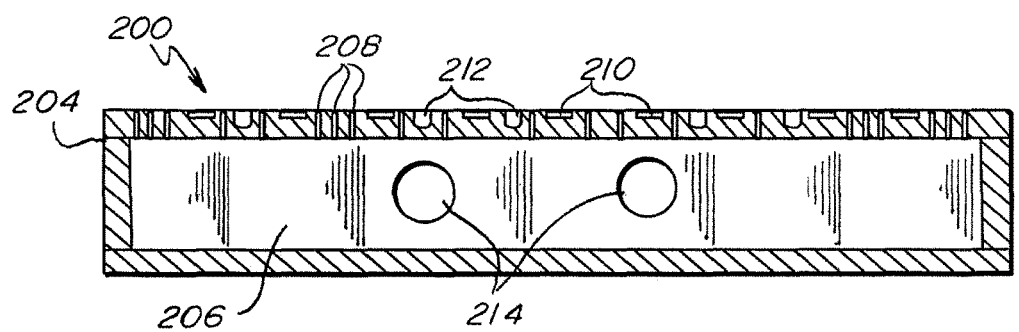
FIG. 21 depicts a cross sectional view through lines 21-21 of the mold of FIG. 20.

FIGS. 20 and 21 show master mold 200 is provided that is generally 60 inches wide and 40 inches long. The mold 200 has a base 204 with a vacuum chamber 206 therebelow. Chamber 206 has vacuum inlets 214 where vacuum hoses may be secured to create a vacuum in chamber 206. Approximately 17 flat and narrow steel bars 210 are secured to base 204 approximately 3.5 inches center to center. Bars 210 provide a surface on base 204 for sonic welding which will be appreciated below. Channels 212 are made in random fashion in base 204. The welding bars 210 abut but do not pass over channels 212. Vacuum ports 208 are in base 204, but not in channels 212, are in flow communication with vacuum chamber 206 therebelow for securing fabric to the mold 200 during manufacturing.

Figure 22:
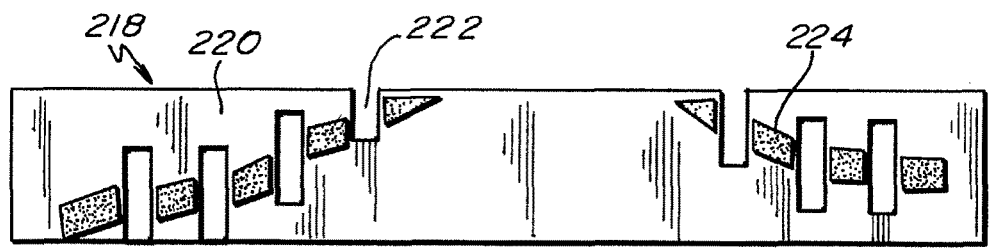
FIG. 22 depicts a bottom plan view of a top mold section that nests into the master mold of FIGS. 20 and 21.
Figure 23:
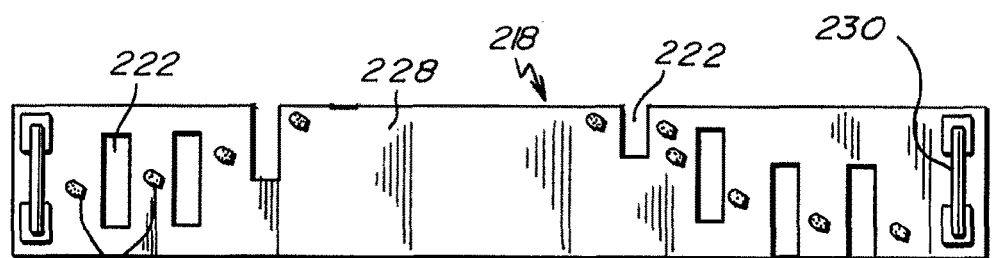
FIG. 23 depicts a top plan view of the top mold section of FIG. 22.
Figure 25:
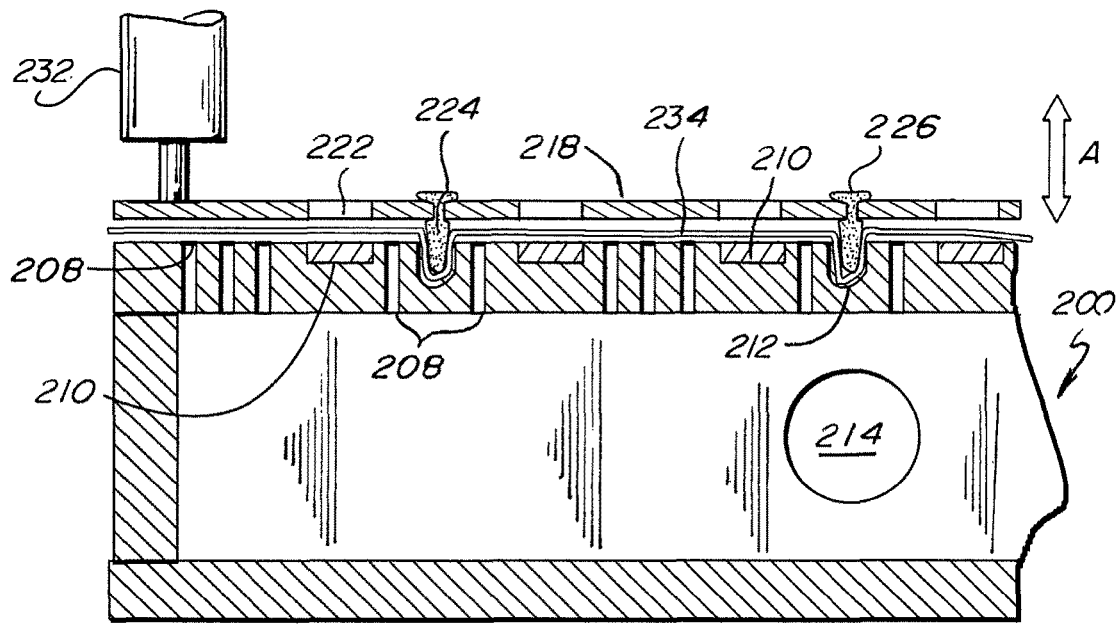
FIG. 25 depicts a cross sectional view of the master mold, outer fabric and top mold along lines 25-25 of FIG. 24.

Five top mold plates or a single plate 218 are shown in FIGS. 22, 23 and 25. The bottom surface 220 (FIG. 22) of top mold 218 shows an array of slots 222 alignable with steel sonic welding bars 210 and are also adjacent mold fingers 226. The fingers 226 are situated to seat into channels 212 of master mold 200 for holding a fabric therein. Slots 222 provide alignable access to the metal bars 210 for sonic welding which will be appreciated below. Retainers 226 hold the channel mating fingers 224 in permanent position. Handles 230 may be provided to place the top mold 218 into position on the master mold 200.

Figure 24:
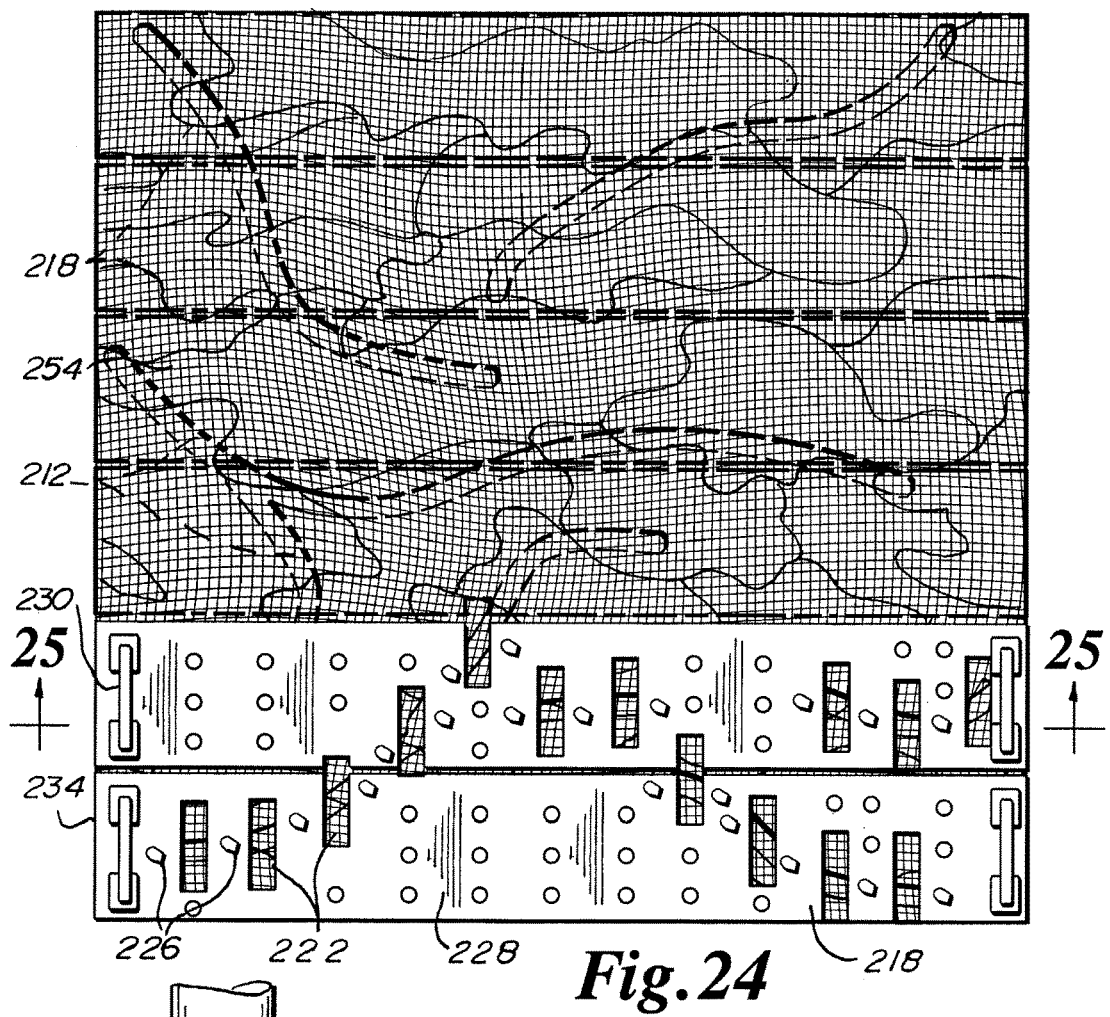
FIG. 24 depicts a top plan view of the master mold for manufacturing the fourth embodiment of a 3D fabric with the exterior fabric in position on the master mold and a section of the top mold in position on the master mold at the first station.

FIGS. 24 and 25 show the first position or station 252 of the 3D fabric manufacturing process. A Camo fabric 234, as previously described, is placed over master mold 200. Next top mold in sections, or as a single plate 218, has its channel matting fingers 226 lowered into channels 212 along with fabric 234. Tapping or rocking of plate(s) 218 will assure that camo fabric 234 is completely pushed down into channels 212. In the case of a single plate, as shown in FIG. 25, the plate 218 may be lifted or lowered into position by cylinders 232 along arrow A. Next vacuum is applied through inlets 214 and ports 208 to hold fabric 234 in position. No vacuum is applied in channels 212 which would interfere with this process. Thereafter the plate 218 is lifted upwardly (arrow A) out of the way from master mold 200 with secured channel formed outer fabric 234 in position for second station 262.

Figure 26:
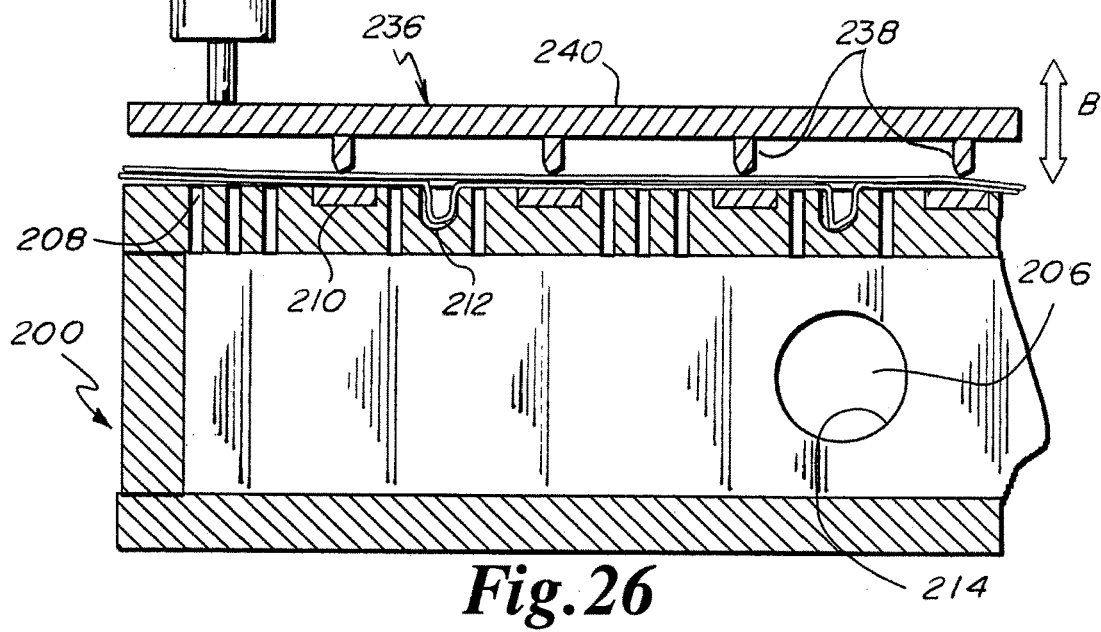
FIG. 26 depicts a cross sectional view of the master mold, outer fabric, inner fabric of FIG. 24 with the sonic welder positioned thereabove.

FIG. 26 shows the second position or station 262 of the 3D fabric manufacturing process. The fabric liner 264 is positioned over the secure outer fabric 234. Then the sonic welder 236 is lowered (arrow B) by cylinders 242 to align welding heads 238 on frame 240 to index upon steel bars 210 immediately adjacent to the terminations of channel fingers 224 for welding the fabric liner to the outer fabric at the steel bars which again are about 3.5 inches center to center. Thereafter, welding heads 238 and frame 240 are lifted upwardly (arrow B) and out of the way of finished 3D fabric 274. In the case where top mold 218 is not moved out of position, welding may be accomplished through slots 222.

With the components understood, the assembly line 250 may now be discussed. In the first position 252 (FIG. 27), the outer (camo) fabric 234 is evenly dispensed from output roll 256 onto the top of master mold 200 with the aid of idler or tension roller 258. Then the preferable one piece top mold 218 is lowered by cylinders 232 onto the master mold 200 with channel fingers 224 indexed into channels 212 thereby pushing the outer fabric 234 into the master mold 200. A repeated punching motion of the mating fingers 224 into channels 212 may be necessary to assure the outer fabric 234 in properly located in channels 212. Then vacuum is applied to out fabric 234 through ports 214 to lock the outer fabric 234 into position. Thereafter, top mold 218 may be lifted out of the way along arrow A by cylinders 232.

As shown in FIG. 28, cylinder 262 is actuated to move master mold 200 to a second position or station 262 whereat liner fabric 264 is introduces from output roll 266 onto the top of outer fabric 234 with the aid of idler or tension roller 268. Next the fabric sonic welder 236 on frame 240 is lowered (arrow B) into position by cylinders 242 onto fabrics 234 and 264 positioned on master mold 200. By this arrangement, welding heads 238 are aligned in slots 220 touching the liner fabric 264, the outer fabric 234 therebelow and the metal bars 210 below the fabrics 234 and 264. The weld is next performed. Thereafter, the sonic welder assembly 236 is lifted upwardly (arrow B) off the welded liner fabric 264 and away from master mold 200. The vacuum is then turned off. The finished 3D fabric 274 is then taken up onto windup roller 270 with the aid of idler or tension roller 272. Lastly, the master mold 200 is moved back to the first station 252 by cylinder 262 to have the assembly process repeated.

Figure 29:
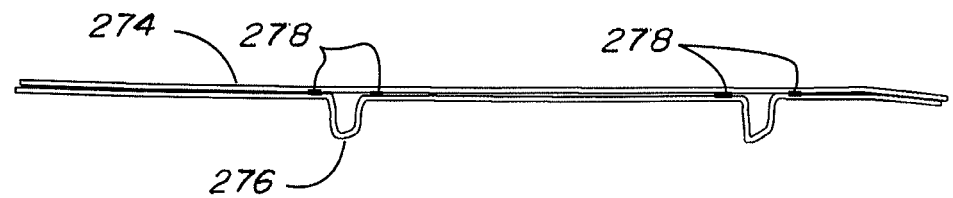
FIG. 29 depicts a cross sectional view through the finished 3D fabric through lines 29-29 of FIG. 30.
Figure 30:
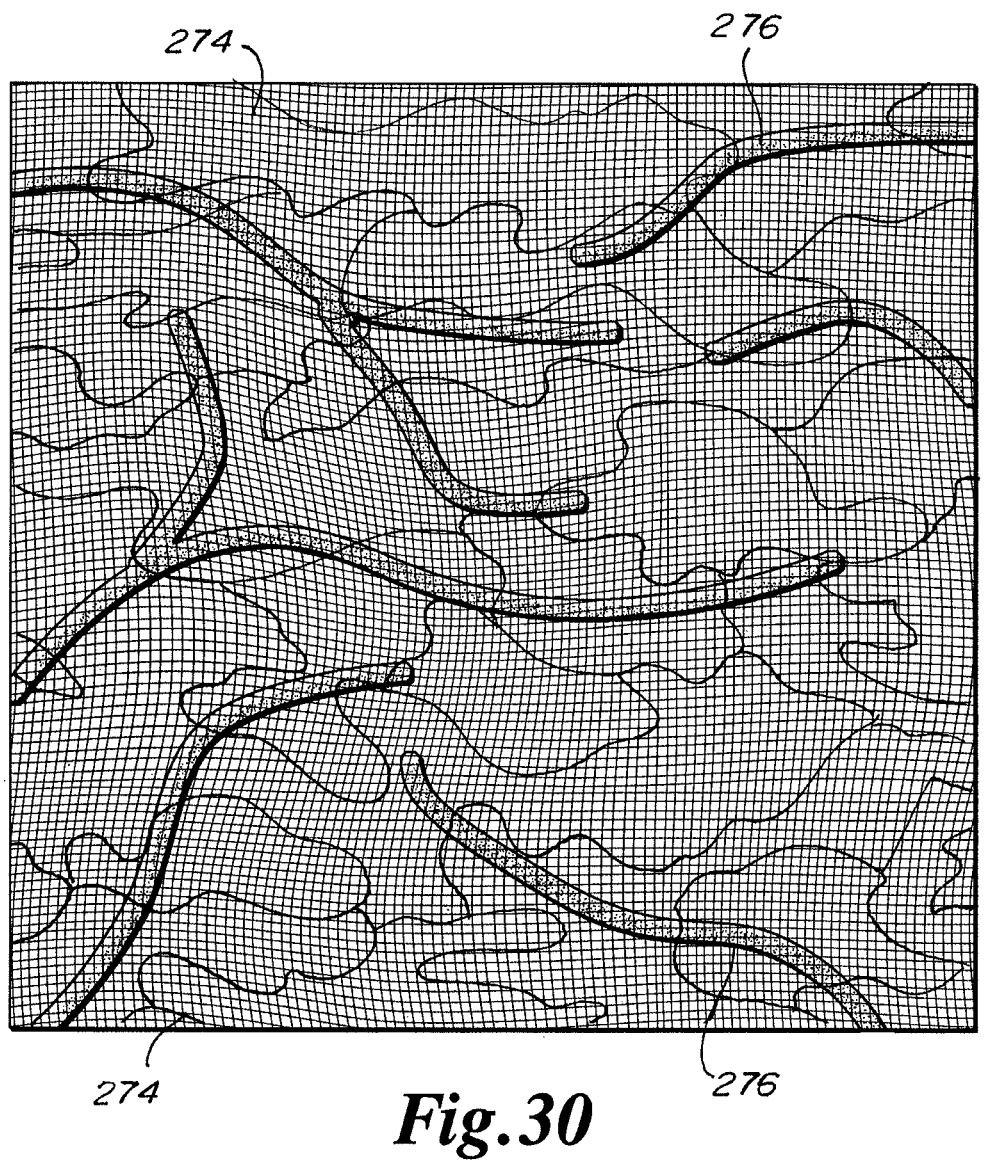
FIG. 30 depicts a top plan view of the finished 3D fabric.

FIGS. 29 and 30 illustrate the finished 3D fabric 274 with ribs or tunnels 276 in the outer fabric 234 being held in place by the positioning of sonic welds 278 between the outer and liner fabrics 234 and 264. This is accomplished by the welds 278 being placed about 3.5 inches apart. This distance may be adjusted for different types of fabrics A fifth embodiment of this invention's 3D fabric 300 and method of making is shown in FIGS. 31 through 34 and described hereat. The method will be described first to appreciate how the fifth embodiment is manufactured and its physical construction. Generally speaking, the fifth embodiment differs from the fourth embodiment by way of its economical use of weldment of liner fabric strips or fabric weldable or glueable tape strips 302.

Figure 31:
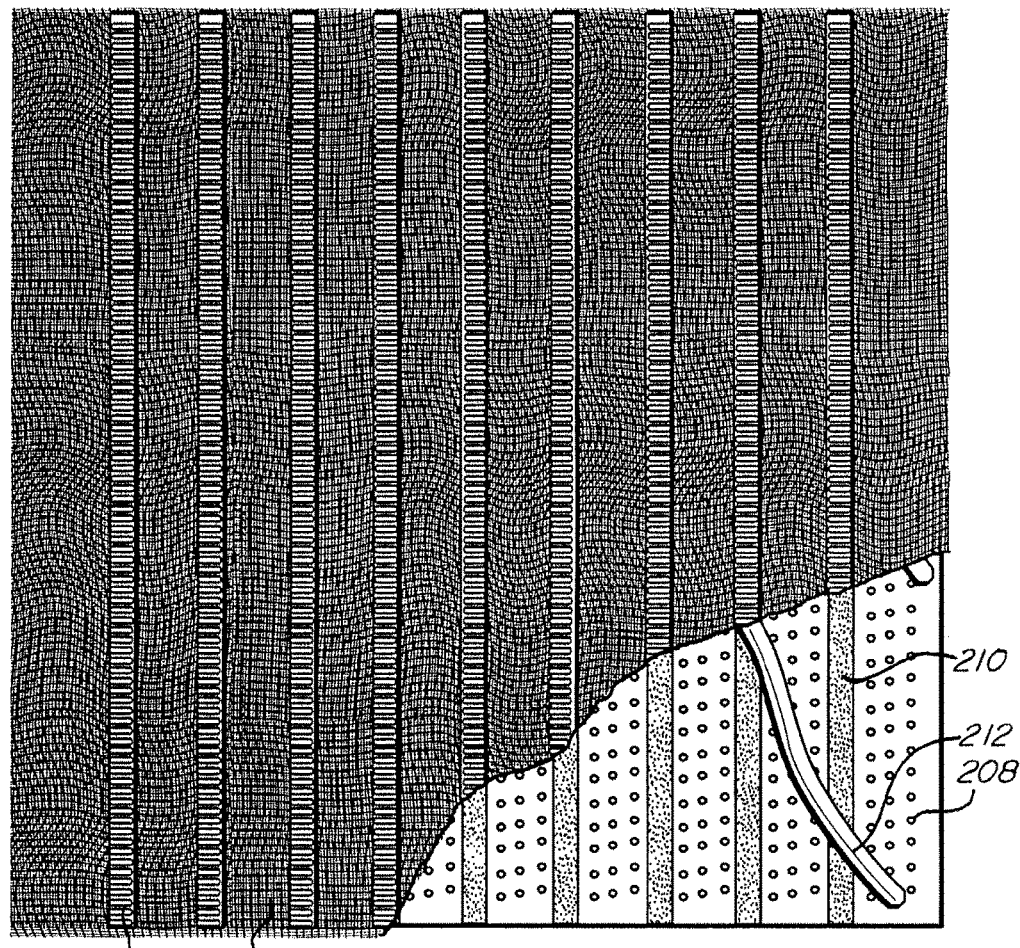
FIG. 31 is a perspective top plan view of the partially finished fifth embodiment of a 3D fabric partially rolled back on the master mold.
Figure 33:
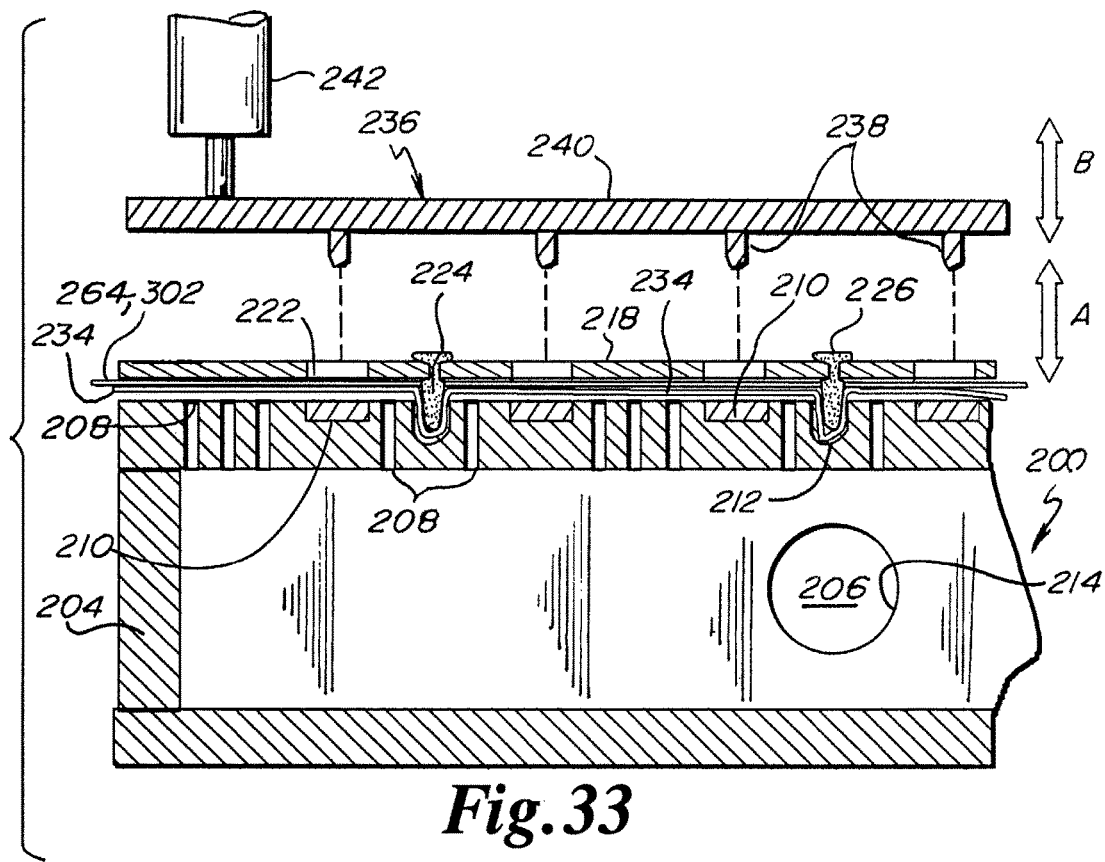
FIG. 33 depicts a cross sectional view of the master mold and second step assembly method of making the 3D fabric of the fifth embodiment.

FIGS. 31 and 33 show master mold 200 is provided that is generally 60 inches wide and 40 inches long. The mold 200 has a base 204 with a vacuum chamber 206 herebelow. Chamber 206 has vacuum inlet 214 where vacuum hoses may be secured to create a vacuum in chamber 206. Approximately 17 flat and narrow steel bars 210 are secured to base 204 approximately 3.5 inches center to center. Bars 210 provide a surface on base 204 for sonic welding which will be appreciated below. Channels 212 are made in random fashion in base 204. The welding bars 210 abut but do not pass over channels 212. Vacuum ports 208 are in base 204, but not in channels 212, are in flow communication with vacuum chamber 206 therebelow for securing fabric to the mold 200 during manufacturing.

Figure 32:
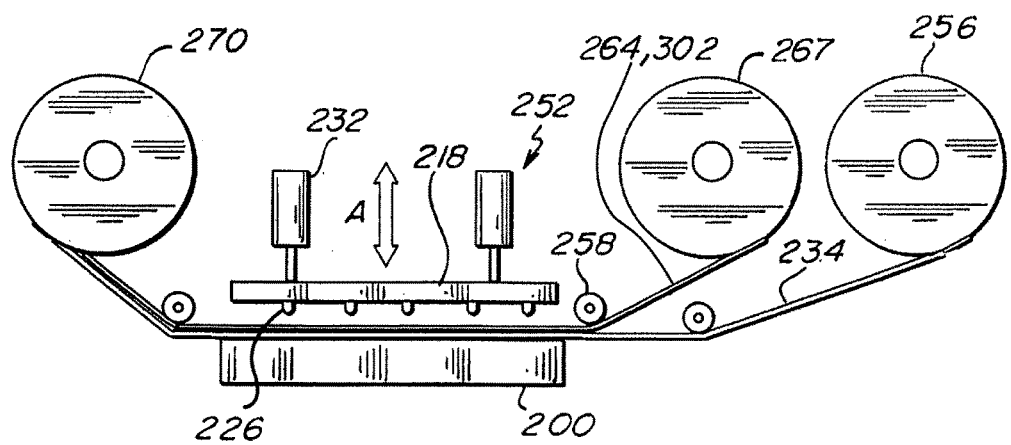
FIG. 32 depicts a side elevational view of the first step in the assembly method of making the 3D fabric of the fifth embodiment.

Five top mold plates or a single plate 218 are shown in FIGS. 32 and 33. The plate 218 has an array of slots 222 alignable with steel sonic welding bars 210 and are also adjacent mold fingers 226. The fingers 226 are situated to seat into channels 212 of master mold 200 for holding a fabric therein. Slots 222 provide alignable access to the metal bars 210 for sonic welding which will be appreciated below. Retainers 226 hold the channel mating fingers 224 in permanent position.

FIGS. 31, 32 and 33 show the first step position of the unfinished fifth embodiment of the 3D fabric 300 manufacturing process. A camo fabric 234, as previously described, is placed upside down over master mold 200 from output roll 256 while contemporaneously, the fabric liner, 264, strips or fabric tape 302 is placed over the camo fabric 234 from output roll 267. Next top mold single plate 218, has its channel matting fingers 226 lowered into channels 212 along with fabric 234 until camo fabric 234 is completely pushed down into channels 212. The plate 218 may be lifted or lowered into position by cylinders 232 along arrow A. Next vacuum is applied through inlets 214 and ports 208 to hold fabric 234 in position. No vacuum is applied in channels 212 which would interfere with this process.

FIG. 33 shows the second step of the 3D fabric 300 manufacturing process. In this method, there is no second station 250. The fabric liner 264 or 302 is already positioned over the secured outer fabric 234. Then the sonic welder 236 is lowered (arrow B) by cylinders 242 to align welding heads 238 on frame 240 to index upon steel bars 210 through slots 222 immediately adjacent to the terminations of channel fingers 224 for welding the fabric liner, strips or tape 263, 302 to the outer fabric at the steel bars which again are about 3.5 inches center to center. Thereafter, welding heads 238 and frame 240 are lifted upwardly (arrow B) and out of the way of plate 218. Thereafter, plate 218 is lifted out of the way of finished 3D fabric 300. The vacuum is then turned off and the finished 3D fabric 302 may be taken up on finished roller 270.

Alternatively, single plate 218 or master mold 200 could be heated to bond strips 302 to the outer fabric 234. If plates 218 were segmented, as previously described, tape or strips 302 could be placed or positioned on top of the camo fabric 234 in the spaces between and after plates 218 were placed on the mold 200.

Figure 34:
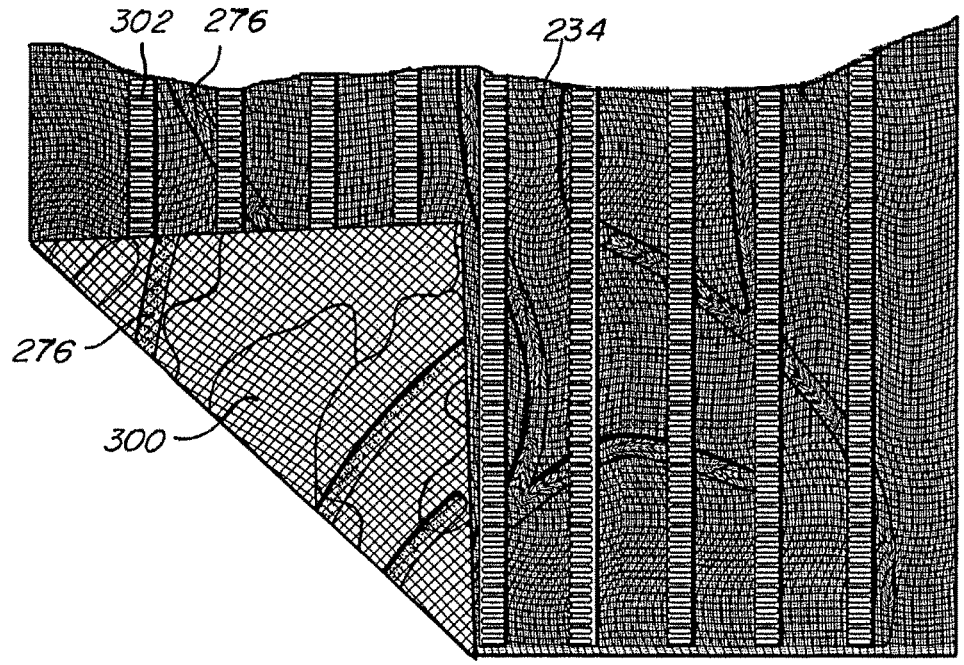
FIG. 34 is a perspective bottom plan view of the finished fifth embodiment of a 3D fabric partially rolled back.
Figure 35:
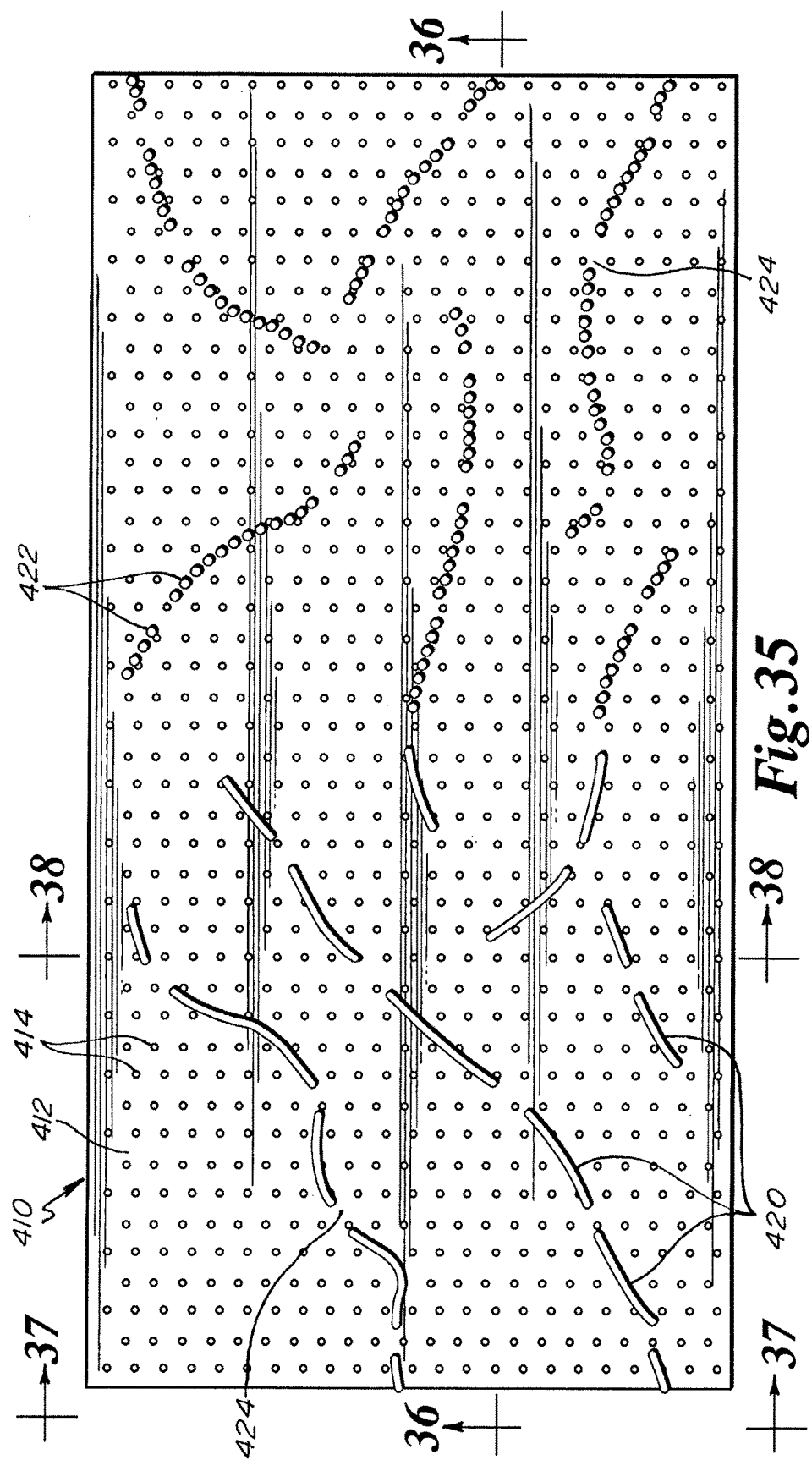
FIG. 35 is a top plan view of the master mold forming plate for the first making a six embodiment of the 3D single-layer synthetic fabric (FIG. 43) of the present invention.
Figure 38:
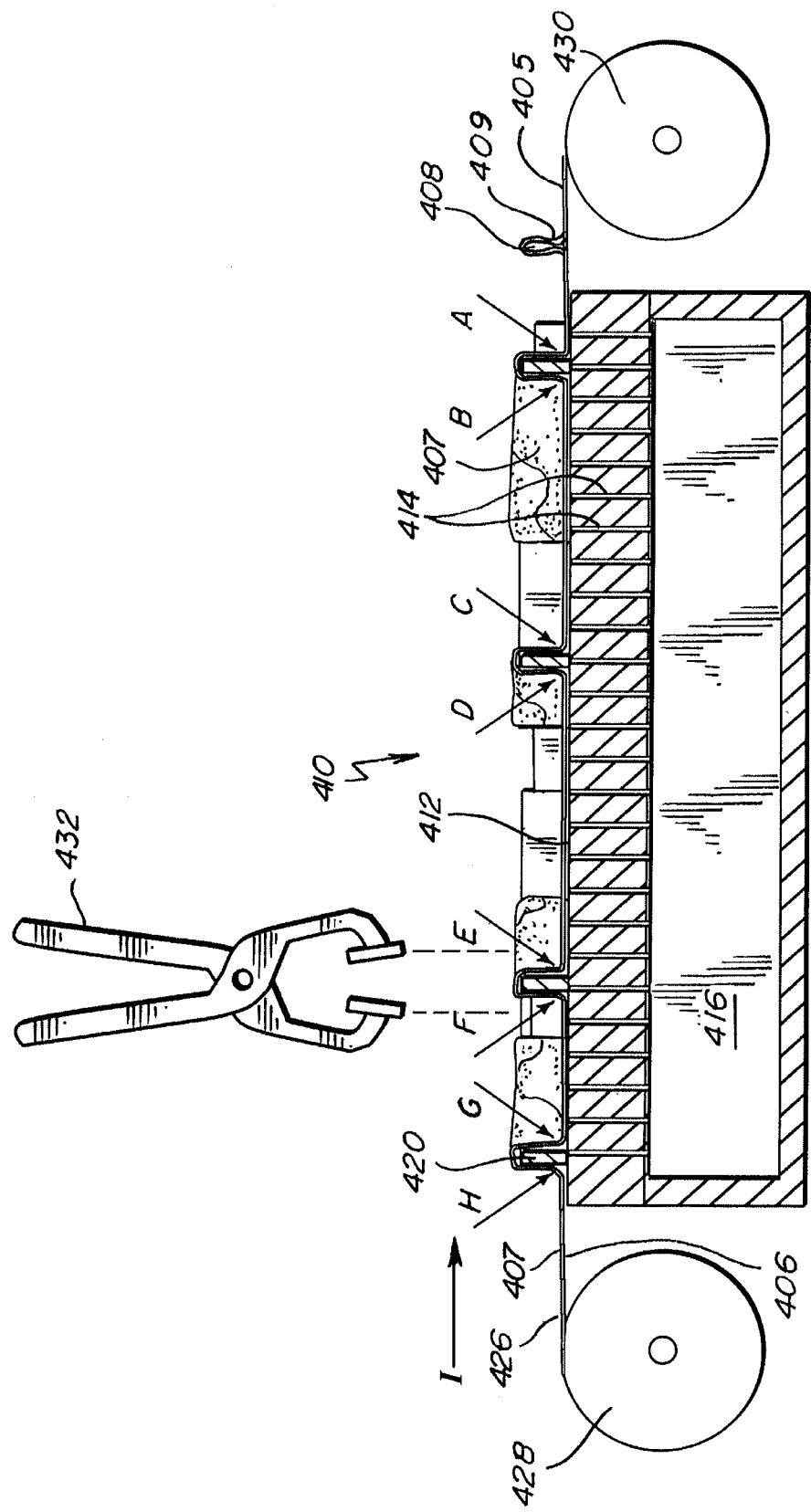
FIG. 38 is a cross sectional view taken along lines 38-386 of FIG. 35.
Figure 39:
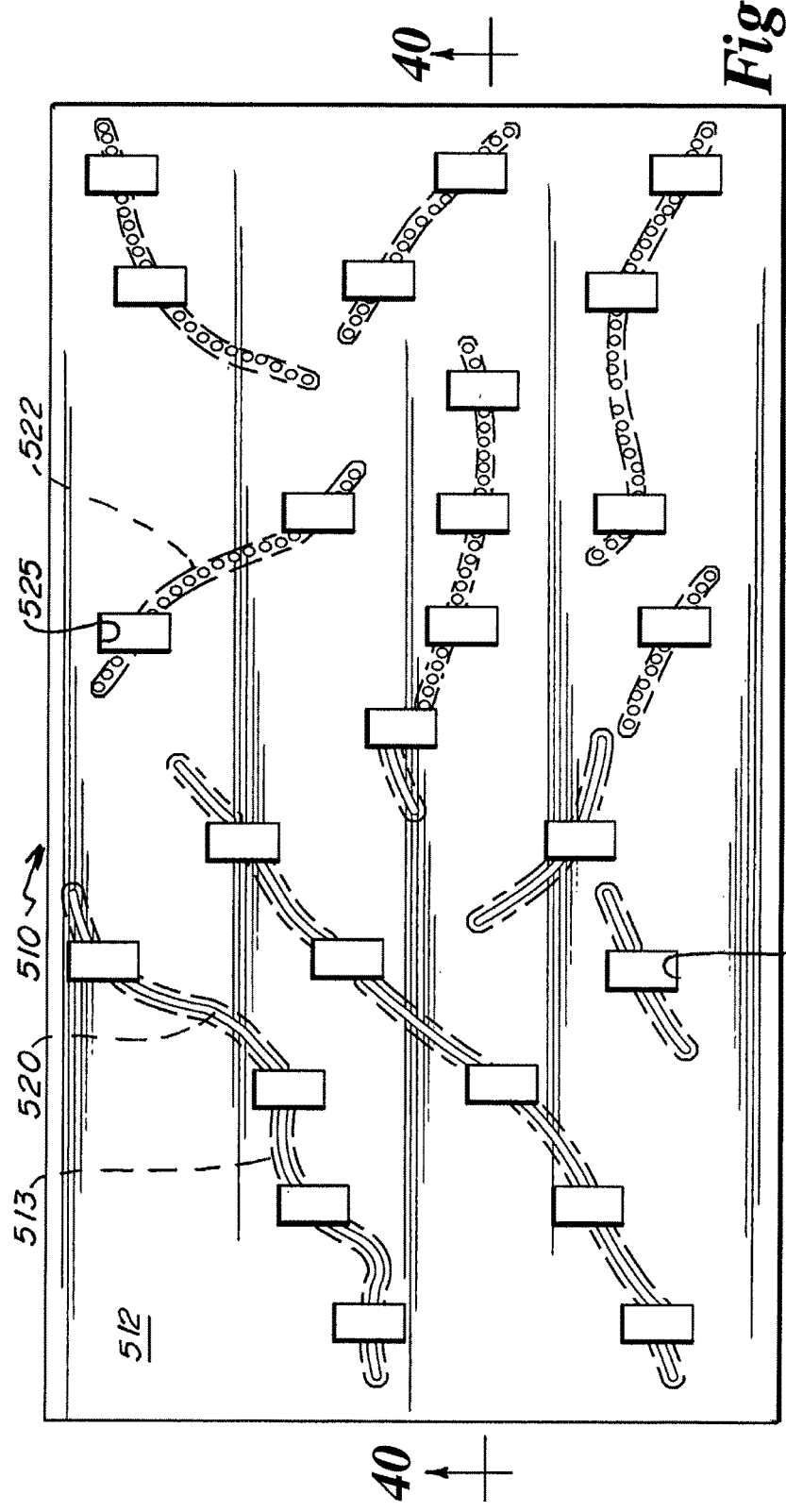
FIG. 39 is a top plan view of the master mold forming plate for a second method of making the six embodiment of the 3D single-layer synthetic fabric (FIG. 43) of the present invention.
Figure 40:
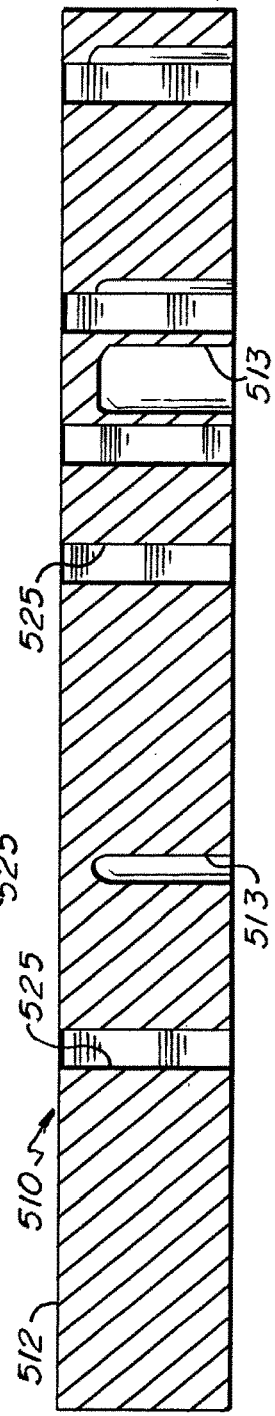
FIG. 40 a cross sectional view taken along lines 40-40 of FIG. 39.
Figure 41:
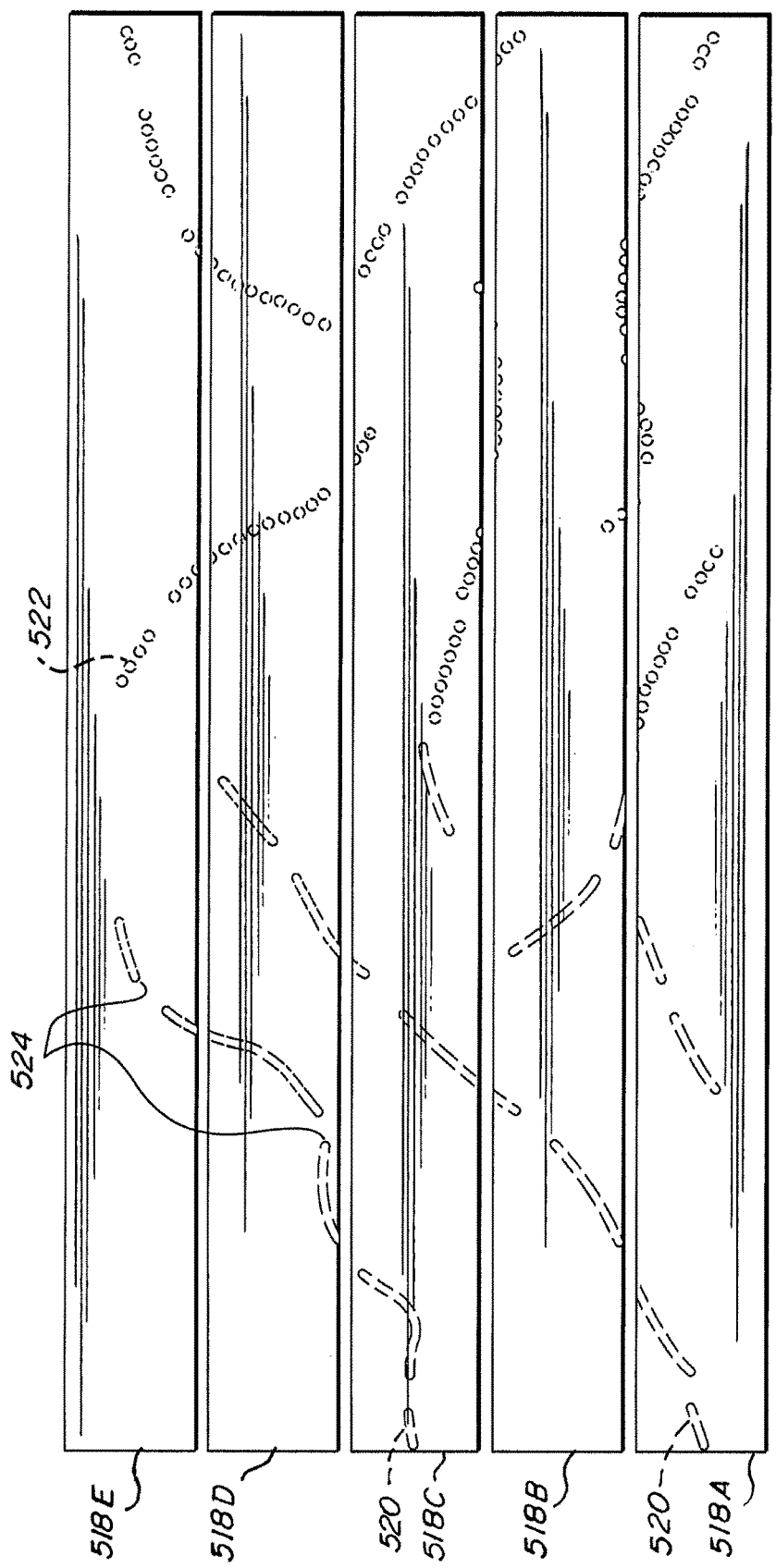
FIG. 41 is a top plan view of the push plates that next into the underside of the master mold forming plate for the second making a six embodiment of the 3D single-layer synthetic fabric (FIG. 43) of the present invention.
Figures 42, 43:
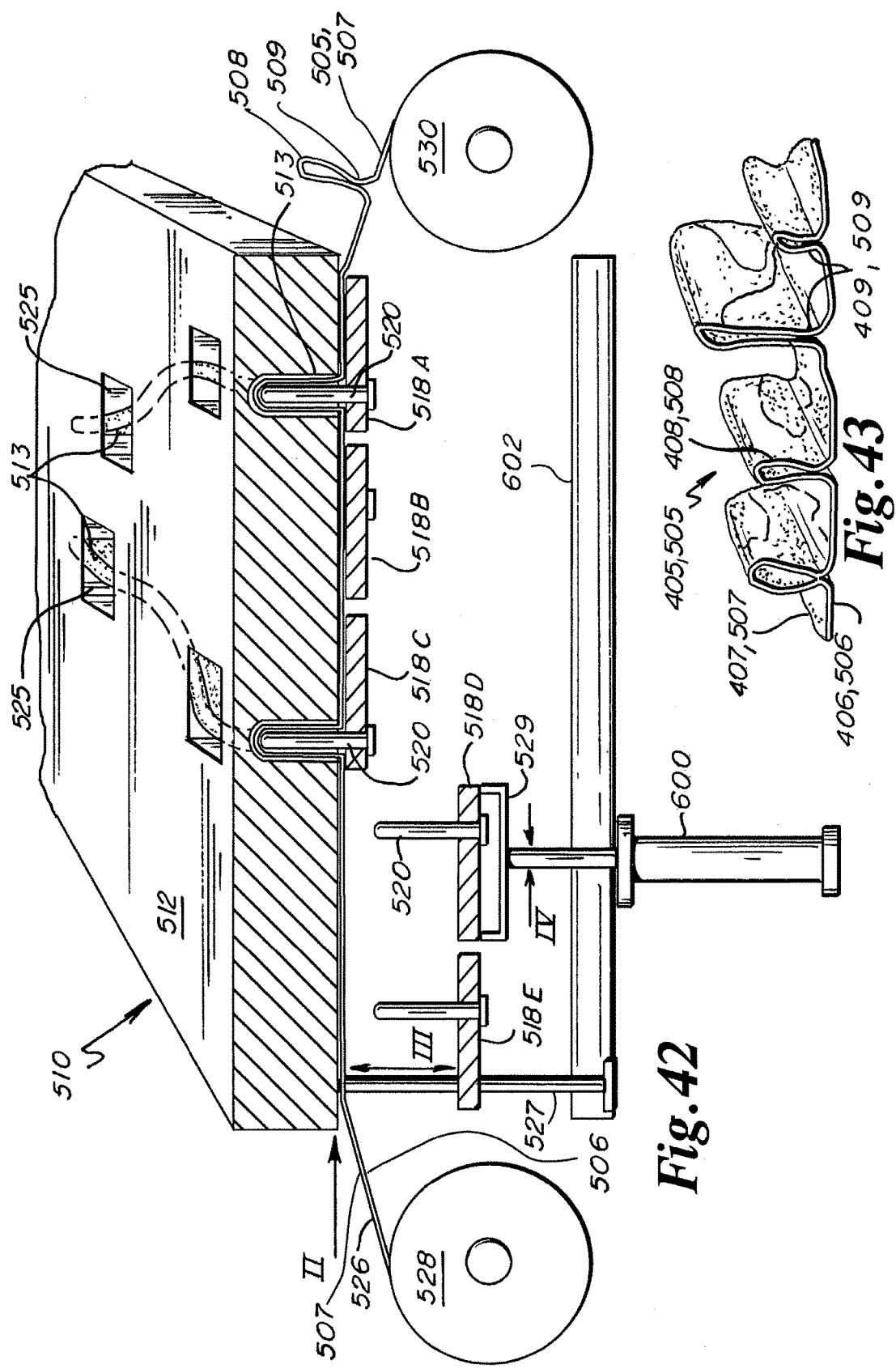
FIG. 42 is an end view of the assembly of the push plates that next into the underside of the master mold forming plate for the second method of making a six embodiment of the 3D single-layer synthetic fabric (FIG. 43) of the present invention.
FIG. 43 is a side perspective view partially broken away of the six embodiment of the 3D single-layer synthetic fabric of the present invention.

FIG. 34 illustrate the finished 3D fabric 300 with ribs or tunnels 276 in the outer fabric 234 being held in place by the positioning of sonic welds 278 between the outer and liner fabrics 234 and 264 (or 302). This is accomplished by the welds 278 being placed about 3.5 inches apart. This distance may be adjusted for different types of fabrics FIGS. 35 through 43 shows a sixth embodiment of the 3D single layer synthetic fabric 405, 505 (FIG. 43) which visually resembles the fifth embodiment 300 with outer fabric 234, 274 having ribs or tunnels 276. Generally speaking, the sixth embodiment 405, 505 differs from the fifth embodiment 300 by way of its economical use of a single-layer of 3D fabric 426, 526 and its weldments 409, 509 upon itself to form tunnels or ribs 408, 508. Again, fabrics applicable for this invention are typically synthetic, which may include but are not limited to, polyester, nylon, Lycra, spandex, nylon-elastane, denier coated nylon oxford cloth, urethane and synthetic blends that lend themselves well to welding together.

Referring to FIG. 35 through 38, the manual method of making the sixth embodiment of the 3D fabric 405 (FIG. 43) may be appreciated. The master mold forming plate 410 has a top side 412 with vacuum ports or channels 414 with a vacuum chamber 416 therebelow with a vacuum port 418 for creating a vacuum within chamber 416. The master mold 410 maybe 60 inches long and 36 inches wide. On the top side 412 are located curved forming blades or fins 420, suitably of different heights for making tall and short tunnels 408. Alternatively, blades 420 may be substituted with forming pins 422 of different heights arranged on the top 412 in a curved fashion. Gaps for welding, fastening or otherwise attaching single-layer synthetic fabric 426 are for fastening the fabric 426 to form tunnels 408 that will remain upward and distinct in condition after weldment. Adjacent the opposite side of the master mold forming plate 410 are located fabric feed roll 428 for dispensing the fabric 426 across the mold plate 410 top side 412 and take up roll 430 for taking up the finished 3D single-layer synthetic fabric 405.

In operation, the single-layer fabric 426 is taken off of output or feed roll 428 and laid onto and across the master mold 410. The vacuum is then turned on. The operator uses his hands or paddles to begin tucking the fabric 426 down onto the mold plate 410 adjacent the blades 420 or pins 422 as to create tunnels over the blades 420 or pins 422. The operator starts at arrow A with this process and proceeds toward the feed roll 428 tucking the fabric 426 into place along arrows B, C, D, E, F, G and H. by this method, more fabric 426 on feed roll 428 may be pulled off roll 428 as needed to form all the tunnels 408. Next the operator manually welds or fastens the fabric together at weldments or tunnel bases 409 in all the gaps 424. This weldment will keep the tunnels 408 upright during use of the 3d single-layer synthetic fabric 405 which may be camouflaged to match the tunnels 408.

Ultrasound hand welding units may be obtained from Rinco ULTRASONICS USA Incorporated, 87B Sand Pit Road, Danbury, Conn. 06810. Other welding techniques might include vibration welding, heat welding, radio frequency (RF) welding or laser welding. RF welders may be obtained from Amcraft RF Welding, 580 Lively Boulevard, Elk Grove Village, Ill. 60007. Thereafter, the finished 3D fabric 434 is wound up onto windup or take up roll 430.

Thereafter the vacuum is stopped and the finished fabric 405 is taken up onto the take up roll as another section of fabric 426 is laid on the mold plate 410 top side 412 for repeating the process.

Referring to FIGS. 39 through 42, an automated method of making the sixth embodiment of the 3D fabric (FIG. 43) may be appreciated. The master mold 510 has a top side 512 with tunnels or channels 513 therebelow and through the mold 510 weld pockets 525.

Below the master mold 510 and separate therefrom are located suitably five push plates 518A-E On top the plates 518A-E are located curved forming blades or fins 520, suitably of different heights for making tall and short tunnels 508. Alternatively, blades 520 may be substituted with forming pins 522 of different heights arranged on the push plates 518A-E in a curved fashion. There are gaps 524 between the blades 520 and the pins 522 that are suitably about 3.5 inches in width. The gaps 524 are alignable with through the mold weld pockets 525 in the master mold 510. The plates 518A-E are slidably mounted on guide pins 524 (only one shown for simplicity of the FIG. 42). By this arrangement, blades 520 or pins 522 are assured to be in alignment with tunnels 513 as the push plates 518A-E are moved up and down along arrow III.

Below the push plates 518A-E is movable lifting block 596 actuated to move up and down (arrow III) by action of a ram or cylinder 600 which is horizontally movable (arrow IV) along rail 602 suitably by stepper motors (not shown). By this arrangement, the push or lifting block 529 is alignable (arrow IV) below the push plates 518A-E starting with 518A and lifting it upward (arrow III) to index blades 520 or pins 522 into channels 513. Alternatively, each push plate 518A-E could have their own fixed and aligned lifting or push blocks 529 each with a fixedly mounted cylinder 600 for sequentially lifting of push plate 518A-E.

In operation, the single-layer fabric 526 is taken off of output or feed roll 528 and laid onto and across the push or lift plates 518A-E just below the master mold 510. The lift block 529 is indexed along the rail 602 just below lift plate 518A. The ram 600 is actuated to lift the lift block 529 and the first plate 518A. By this action, the blades 520 are moved upward (arrow III) into a locked position as to index the single layer fabric 526 up and into the channels or tunnels 513 as more fabric 526 is pulled of the feed roll 528. Next, the block 529 is lowered (arrow III) and moved along rail 602 (arrow IV) as to index below under the next lifting plate 518B. The block is then lifted (arrow III) and the next plate 518B moves upwardly as its blades 520 are moved upward (arrow III) into a locked position as to further index more of the single layer fabric 526 up and into the channels or tunnels 513. During this action, more fabric 526 is pulled off the feed roll 528. This cycle is repeated until plate 518E is lifted into position and more fabric 526 is pulled of the feed roll 528.

Thereafter, welding is commenced in the through the mold weld pockets 510 at tunnel bases 509 in the gap 524 areas either with hand held welders or automated or robotic welding equipment. Ultrasound welding heads may be obtained from Dukane Corporation, 2900 Dukane Drive, St. Charles, Ill. 60174. Again, Ultrasound hand welding units may be obtained from Rinco ULTRASONICS USA Incorporated, 87B Sand Pit Road, Danbury, Conn. 06810. Other welding techniques might include vibration welding, heat welding, radio frequency (RF) welding or laser welding. RF welders by be obtained from Amcraft RF Welding, 580 Lively Boulevard, Elk Grove Village, Ill. 60007. Thereafter, the finished 3D fabric 505 is wound up onto windup or take up roll 530.

The finished 3D single-layer synthetic fabric 405, 505 is ideal for use with camouflaged. fabric which further accentuates the 3D effect particularly when the pattern is matched with the tunnels to further effectuate the look of tree branches and the like. Clothing and hunting blinds are such desirable examples.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method of making a three-dimensional single-layer fabric from a flat master mold forming plate with a top side having upstanding random curved blades or pins of different heights with gaps along the length of the random curved blades or pins, comprising:
    a) placing a synthetic fabric over the master mold forming plate;
    b) moving the fabric down onto the plate and over the blades or pins forming random curved tunnels of different heights with bases;
    c) intermittently hand bonding the tunnels at their bases in the gaps making tall and short tunnels thereby making the three-dimensional single-layer fabric; and
    d) removing the three-dimensional single-layer fabric from the master mold forming plate.

2. The method of claim 1, where the bonds are chosen from a group consisting of sonic welds, heat welds, vibration welds, laser welds, RF welds and adhesive bonds.

3. The method of claim 1, wherein the gaps are approximately 3.5 inches long.

4. The method of claim 1, wherein the tunnels are between 1 and 60 inches in length.

5. The method of claim 1, wherein the tunnels have a variable height between 0.25 and 4.0 inches.

6. A method of making a three-dimensional single-layer fabric from a flat master mold forming plate with a top side having upstanding random curved blades or pins of different heights with gaps along the length of the random curved blades or pins, comprising:
    a) placing a synthetic fabric against the master mold forming plate;
    b) moving the fabric down onto the plate and over the blades or pins forming random tunnels between 1 and 60 inches in length and between 0.25 and 4.0 inches in variable height;
    c) intermittently hand bonding the tunnels at their bases in the gaps approximately 3.5 inches apart thereby making the three-dimensional single-layer fabric; and
    d) removing the three-dimensional fabric from the master mold forming plate.

7. The method of claim 6, where the bonds are chosen from a group consisting of sonic welds, heat welds, vibration welds, laser welds, RF welds and adhesive bonds.

* * * * *